(12) United States Patent
Robinton et al.

(10) Patent No.: US 9,998,922 B2
(45) Date of Patent: Jun. 12, 2018

(54) INSTANT MOBILE DEVICE BASED CAPTURE AND CREDENTIALS ISSUANCE SYSTEM

(71) Applicant: ASSA ABLOY AB, Stockholm (SE)

(72) Inventors: Mark Robinton, Eden Prairie, MN (US); Nils Wahlander, Eden Prairie, MN (US); Masha Leah Davis, Austin, TX (US)

(73) Assignee: ASSA ABLOY AB (SE)

( * ) Notice: Subject to any disclaimer, the term of this patent is extended or adjusted under 35 U.S.C. 154(b) by 51 days.

(21) Appl. No.: 14/771,934

(22) PCT Filed: Mar. 6, 2014

(86) PCT No.: PCT/IB2014/000842
§ 371 (c)(1),
(2) Date: Sep. 1, 2015

(87) PCT Pub. No.: WO2014/135982
PCT Pub. Date: Sep. 12, 2014

(65) Prior Publication Data
US 2016/0014605 A1    Jan. 14, 2016

Related U.S. Application Data

(60) Provisional application No. 61/773,677, filed on Mar. 6, 2013.

(51) Int. Cl.
*H04W 12/08* (2009.01)
*G06F 21/32* (2013.01)
(Continued)

(52) U.S. Cl.
CPC .......... *H04W 12/08* (2013.01); *G06F 21/32* (2013.01); *G06F 21/33* (2013.01); *G06F 21/34* (2013.01);
(Continued)

(58) Field of Classification Search
CPC .......... G06F 21/20; G06F 21/00; G06F 21/10; H04W 4/00; H04W 12/08; H04W 12/06;
(Continued)

(56) References Cited

U.S. PATENT DOCUMENTS 7,748,636 B2 *  7/2010  Finn ..................... G06K 7/0008
                                                          235/375
8,666,437 B2 *  3/2014  Stromberg ............. G06Q 20/32
                                                          455/422.1
(Continued)

FOREIGN PATENT DOCUMENTS

EP         2154625        2/2010
WO    WO 2004/092965    10/2004

OTHER PUBLICATIONS

International Search report and Written Opinion for PCT/IB2014/000842, dated Jul. 11, 2014, 8 pages.
(Continued)

*Primary Examiner* — Thanhnga B Truong
(74) *Attorney, Agent, or Firm* — Sheridan Ross P.C.

(57) ABSTRACT

Methods and systems are provided for enabling a user to enroll with a security system and create access credentials via a mobile device. In particular, a mobile device user may use the mobile device to enter user information, including identification information, communicate the information to a manufacturer for creating access credentials associated with the user. The user information may be verified before it is sent to manufacturing. Verification may be based on rules stored in memory and can be configured to prevent fraud. In addition, aspects of the present disclosure anticipate that a user may monitor a status of manufacturing associated with the access credentials.

27 Claims, 13 Drawing Sheets

(51) Int. Cl.
| | |
|---|---|
| H04L 29/06 | (2006.01) |
| G06F 21/33 | (2013.01) |
| G06F 21/34 | (2013.01) |
| G06K 9/00 | (2006.01) |
| H04N 5/44 | (2011.01) |
| H04W 12/06 | (2009.01) |

(52) U.S. Cl.
CPC ..... *G06K 9/00013* (2013.01); *G06K 9/00288* (2013.01); *H04L 63/062* (2013.01); *H04L 63/0876* (2013.01); *H04N 5/44* (2013.01); *H04W 12/06* (2013.01); *H04L 63/0861* (2013.01)

(58) Field of Classification Search
CPC .......... H04W 8/26; G06K 19/06; G06K 7/08; G06K 9/00; H04N 5/44
USPC .......... 726/3, 5, 6, 9; 455/466, 422.1, 556.1, 455/558; 235/492, 375, 380, 451, 487; 348/77
See application file for complete search history.

(56) References Cited

U.S. PATENT DOCUMENTS

| | | | |
|---|---|---|---|
| 9,569,595 B2* | 2/2017 | Delos Reyes | ........... G06F 21/10 |
| 2005/0229007 A1 | 10/2005 | Bolle et al. | |
| 2010/0162376 A1* | 6/2010 | Jeong | ................ G06F 21/33 |
| | | | 726/9 |

OTHER PUBLICATIONS

International Preliminary Report on Patentability for PCT/IB2014/000842, dated Sep. 17, 2015, 6 pages.
"Identive Group Acquires idOnDemand: SaaS-based Identity Credentials Extend Secure ID Capabilities," Identive Group, Inc., 2011, 2 pages.
"idOnDemand_Documentation," idOnDemand, retrieved on Jan. 10, 2013, 99 pages.
"idOnDemand_SmartID_Mobile," idOnDemand, retrieved on Jan. 10, 2013, 1 pages.
"idOnDemand—Clientless OTP mobility solution," brochure, www.idondemand.com, date unknown, 1 page.
"idOnDemand—IT System Access," idOnDemand, retrieved on Jan. 10, 2013, 1 page.
"idOnDemand—Universal Access," idOnDemand, retrieved on Jan. 10, 2013, 1 page.
"PremiSys ID Pro, Photo ID Software for a Secure ID Badging Program," retrieved from http://web.archive.org/web/20111116190640/http://www.identicard.com/products/premisysidpro.htm, IDenticard Systems, 2011, 2 pages.

* cited by examiner

INSTANT MOBILE DEVICE BASED CAPTURE AND CREDENTIALS ISSUANCE SYSTEM

CROSS REFERENCE TO RELATED APPLICATION

This application is a national stage application under 35 U.S.C. 371 of PCT Application No. PCT/IB2014/000842 having an international filing date of Mar. 6, 2014, which designated the United States, which PCT application claimed the benefit of U.S. Application Ser. No. 61/773,677, filed Mar. 6, 2013, both of which are incorporated by reference in their entirety.

FIELD OF THE DISCLOSURE

The present disclosure is generally directed toward using mobile devices in the manufacture of access credentials.

BACKGROUND

Creating and issuing access credentials for a typical security system tends to place a burden on individuals registering with the system by requiring that each person engage in a lengthy security enrollment process. Among other things, each person who registers with the security system must provide user information that can be used to identify the person to the security system. Such information can at least include a photograph, fingerprint data, signature (e.g., written, thermal, magnetic, weight, dimensional, etc.), biometric information, password, passkey, passphrase, address, title, rank, department/group, clearance level, health information, allergies, and the like.

Typical security systems utilize an enrollment station, and associated equipment, to perform the information gathering and storage associated with registering a person with the security system. The enrollment station may include a computer (or other processor), a camera, a scanner, a voice recorder, and other input devices to receive information entered about a person. This information may then be stored in a memory that is associated with the processor and used to create access credentials for a specific person. In some cases, the information will be sent to an access credentials manufacturing facility to create highly secure access credentials. In other words, the manufacturing facility can create tamperproof access credentials that include an embedded chip and memory containing the user information collected at the enrollment station. These tamperproof access credentials may contain the user information in an encrypted format.

As can be appreciated, there are several shortcomings associated with the security system enrollment station. For instance, some security systems require an authorized security officer to operate and/or administer the security enrollment station. This dedicated officer may be specially trained to work with the enrollment equipment and/or enrollment software. As such, users may be prevented from using the enrollment station in the absence of the security officer.

Additionally, the typical enrollment station must be physically located and maintained at a single location in a secured environment. In the case of a business, an enrollment station may be located in an area of a building/facility adjacent to a security officer or human resources representative. As can be expected, the equipment associated with an enrollment station can require a significant amount of physical space.

Moreover, the enrollment equipment, if lost or misused, could be employed to create fraudulent credentials for unauthorized users. Therefore, users must visit the physical enrollment station and provide all of the information required by the security system in order to successfully register. Next, the user must wait for their security access credentials to be manufactured. In most organizations, the registered user may be required to return to the enrollment station to pick up their manufactured access credentials from the security officer.

SUMMARY

It is, therefore, one aspect of the present disclosure to provide methods, devices, and systems that allow a user to utilize a mobile device to collect their own access credential information, verify the information, send the information to a credentials manufacturing facility or printer, and receive access credentials for a particular security system. Benefits associated with a self-enrolling security system operated via a user's mobile device include, but are not limited to, allowing the user to enroll without visiting a physical enrollment station or even a security officer to obtain authorization to a security system, verifying user enrollment information automatically, retrieving user information from data storage associated with the mobile device, and monitoring the manufacturing status of access credentials via the mobile device or other interface.

As can be appreciated, a mobile device may at least include one or more input device (e.g., keyboard, microphone, etc.), an image capture system (e.g., a camera, image sensor, and the like), memory, and the ability to communicate via one or more communication networks. In other words, the mobile device includes equipment commonly associated with a typical security system enrollment station. Additionally or alternatively, a mobile device typically includes information associated with the mobile device user. For instance, a mobile device may include contact information and/or ownership information of a user. This information may be stored in one or more features of a mobile device, including but in no way limited to, a contact list, a Subscriber Identity Module ("SIM") card, a memory, and/or another application. It is an aspect of the present disclosure that an access credentials application running via the mobile device may retrieve user information from one or more of the features. In other embodiments, a thin-client version of the enrollment process may be utilized such that a dedicated and purpose-built application is not required to retrieve user information and enable the user to self-enroll with the security system. Retrieval of the information may be performed manually via user input or automatically via the access credentials application.

An image capture system associated with the mobile device may be used to collect visual information and/or biographical of the user requesting access credentials. In some instances, the mobile device may include at least one camera on the device for the purposes of capturing visual user information. For example, a mobile device may include a front-facing and/or rear-side camera. The front-facing camera may be equivalent to any camera mounted to a portion of the device such that the image sensor faces a user who is looking at the mobile device Graphical User Interface ("GUI"). A rear-side camera may include a camera mounted to a portion of the device such that the image sensor faces away from a user who is looking at the mobile device GUI.

Depending on the application, a specific image resolution may be required for a user photograph associated with access credentials. In this case, the appropriate camera (with appropriate image resolution) may be selected manually and/or automatically via an application associated with the mobile device. It is anticipated that a user may take an enrollment photograph using either camera in accordance with embodiments of the present disclosure. Additionally or alternatively, a user may provide a previously taken photograph (even by another camera) that is stored in a memory. In still other embodiments, a user's image may be captured from a video stream when the user is engaged in a video call with a security guard or similar personnel.

Some security systems may prevent a user from providing a previously taken photograph due to security concerns. However, the security system may allow the user to provide such a photograph where the photograph is verified. In one case, the user may be prompted to take a photograph using the mobile device to provide a comparison to the provided photograph. In the event that the photographs pass a comparison test, the previously taken photograph may be allowed for use with the access credentials.

The image capture system associated with the mobile device may also be used to capture other personal information about the user. In particular, one or more images of a user's already-issued identification card (e.g., passport, driver's license, business card, student ID, etc.) can be captured personal information about the user can be obtained via Optical Character Recognition (OCR) technologies. Once obtained, this personal information can be provided along with an actual image of the user to a printer or the like that completes the enrollment process.

In the event that voice data is required as part of the enrollment process with a security system, the user may provide such data via the mobile device microphone. Some security systems may implement a passphrase, or voice key, that will need to be input by a user for a base comparison and/or authorization decision to be accurately made. The voice data provided by a user at the time of self-enrollment via the mobile device may be used as a stored key for future authorization and/or access decisions.

It is an aspect of the present disclosure that a user's specific access credentials can be manufactured using the data collected by the mobile device and/or during a communication session in which the user is engaged. The collection of this data may be achieved by a user running an access credentials application via the mobile device or by capturing an image during a video communication session and forwarding the captured image to a credentials manufacturing server/printer. Among other things, the access credentials application may store information associated with a user, interface with a credentials creation system server, send and/or receive messages, and/or otherwise control aspects of the mobile device. In some embodiments, the access credentials application may be located on the device. In other embodiments, the access credentials application may be accessed across a communication network via the mobile device, where the access credentials application is stored on a remote server. In yet another embodiment, the access credentials application may be run in two or more parts, where at least one part is resident on the mobile device and at least one other part is resident on a remote server.

An access credentials application may be downloaded to a mobile device by a user accessing an application store, or network-attached site. The application store may be private or public and may be located on a private and/or public network. In some instances, the application store may be accessed by a user navigating to a site across a network via the mobile device. It is anticipated that the site location may be provided by supplying a user with a Uniform Resource Locator ("URL"), TinyURL, URL alias, or other network location address. In some embodiments, a mobile device may be used to scan a Quick Response ("QR") code, barcode, 2-Dimensional ("2D") code, and/or 3-Dimensional ("3D") code to prompt the mobile device to navigate to the application store. As can be appreciated, a mobile device may be directed to an application store site upon presenting the mobile device to a Near Field Communications ("NFC") tag, Radio Frequency Identification ("RFID") tag, Bluetooth tag, or the like. In any event, upon providing appropriate authorization, the user may download the access credentials application to the mobile device. In one example, the site location of the access credentials application store may be provided in any of the forms disclosed herein (as well as their equivalents) to a user in an employment packet and/or other form of correspondence.

In some embodiments, the access credentials application may employ one or more security features that can be used to verify collected user information. For instance, the access credentials application may automatically collect information relating to the mobile device, communication network used by the mobile device, and location data associated with the mobile device. Information relating to the mobile device may include at least one Media Access Control ("MAC") address, hardware data (e.g., make, model, version, etc.), software data (e.g., operating system information, registration information, version, and the like), firmware data, and/or other unique identifiers or fingerprints associated with a mobile device. This data may be aggregated by the access credentials application. This collected mobile device information may be compared to the information entered by a user as part of the enrollment process associated with the access credentials application. In the event that data does not match, the mismatched data may be analyzed for data entry/typographical errors (i.e., "bad data") and/or for suspected fraudulent activity. In one embodiment, a user may be alerted of data errors and/or suspected fraud. Accordingly, a user may be provided at least one opportunity to correct any errors to ensure a timely verification of the user information.

Additionally or alternatively, the access credentials application may collect network and/or location information associated with the mobile device as a security and/or verification feature. For example, a user may be prompted to initiate the access credentials application and registration at a specific address or location. When the user initiates the application, the access credentials application may retrieve location information from the mobile device. Location information may include but is not limited to data obtained by a satellite positioning system receiver (e.g., a wireless receiver or Global Positioning System ("GPS") (US), Global Navigation Satellite System ("GLONASS") (Russia), Galileo Positioning System (EU), Compass Navigation System (China), Indian Regional Navigational Satellite System ("IRNSS") (India), etc.), Wi-Fi Access Points, Cell Towers, combinations thereof, and the like to determine a general and/or specific location of the mobile device. It is anticipated that the access credentials application may make use of one or more components associated with the mobile device to determine the location of the mobile device. This location information may be compared to the prompted specific address or location to ensure that the data matches within a given threshold. In the event that the data does not match, the user may be alerted, the mismatch may be analyzed for possible fraud, and/or the user may be prompted to submit information in accordance with rules associated with the access credentials application.

In some embodiments, information collected by a user's mobile device via the access credentials application may be provided to a credentials creation system server. In some cases the collected information may be aggregated and sent to the server across a communication network. The credentials creation system server may be responsible for at least one of performing a verification check on the collected information received from a mobile device, sending manufacturing information (e.g., including the collected information, etc.) to a credentials manufacturing server and/or facility, receiving manufacturing information from the credentials manufacturing server (e.g., status, warnings, etc.), and sending and/or receiving messages to and/or from the mobile device, respectively.

It is anticipated that the credentials creation system server may receive verified and/or unverified collected information from a mobile device in accordance with embodiments of the present disclosure. As such, the credentials creation system server may perform first level (i.e., initial) verification checks of collected information received from a mobile device. In some embodiments, a first level verification check may be performed on unverified collected information. Additionally or alternatively, the credentials creation system server may perform a second level (e.g., secondary) verification checks of collected information received from a mobile device. In some embodiments, a second level verification check may be performed on verified and/or unverified collected information. As can be appreciated, tertiary, and possibly subsequent verification checks, may be employed as a security feature. Subsequent verification checks may be desired in administering, or issuing, access credentials for highly-secure security systems. The verification check may refer to data stored in a memory associated with the credentials creation system server. For example, the verification check may compare a photograph of a specific user stored in memory with a photograph provided by a specific user via the mobile device. Similar to the verification checks disclosed above, the check may be used to determine data entry errors, possible fraud, and other potential reasons for data mismatch in a given threshold.

Another aspect of the present disclosure may involve allowing a user of the mobile device (e.g., the user performing the self-enrollment process) to access reporting and status information related to the creation of their credential. In other words, when a user places an order for a credential using embodiments described herein, that user may also be provided with status information related to the manufacturing status of their credential. When specific milestones in the manufacturing process are met or passed, the user may be notified by push or pull notification of the specific milestone and future milestones. Thus, a user may automatically be notified when their credential is ready for pickup, when their credential has been shipped to them, etc.

In some embodiments, the collected information may be sent directly or indirectly to a credentials manufacturing server and/or printer. The credentials manufacturing server may be server associated with a credentials manufacturing facility or it may be processor within a dedicated credential printer. This facility may be located remotely or locally from the credentials creation system server. Alternatively, the credentials manufacturing server may be a server associated with a networked credentials manufacturing device. A network-connected printer is an example of a credentials manufacturing device. As used herein, the term "manufacturing" includes physical and/or digital provisioning, creating, and/or encoding of contents for a credential or a credential itself.

Among other things, the credentials manufacturing server may function to receive manufacturing orders from a mobile device and/or a credentials creation system server. An order may include aggregated collected information that can be used to manufacture access credentials for a user. As an order progresses through the manufacturing processes (e.g., queuing, manufacturing, packaging, shipping, etc.) the status of the order is stored in memory. Depending on the stage of manufacturing a user may request a manufacturing status, request to modify an order, and even a request cancel an order, via a mobile device or network-enabled user interface. For instance, if an order has proceeded to "shipping" the order may not be canceled, but the shipping address may be changed. On the other hand, an order queued for manufacturing may allow requests to modify the order, cancel the order, and or view the status of an order. These requests may be made directly to the credentials manufacturing server and/or indirectly via the credentials creation system server. In some embodiments, the status may be sent directly to a mobile device via the credentials manufacturing server. Additionally or alternatively, the status of an order may be sent indirectly to a mobile device via the credentials creation system server.

It should be appreciated that while most examples of a credential provided herein are related to access and visitor credentials, embodiments of the present disclosure are not so limited. To the contrary, the term "credential" as used herein should be understood to include physical access credentials (e.g., access cards, key fobs, stickers, wrist bands, passes, printed badges, visitor badges, etc.), virtual access credentials (e.g., access credentials stored in a secure element of a mobile communication device, and other non-access credentials (e.g., loyalty cards for a retailer, event badges at a trade show, etc.)

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

Also, while the disclosure is described in terms of exemplary embodiments, it should be appreciated that individual aspects of the disclosure can be separately claimed. The present disclosure will be further understood from the drawings and the following detailed description. Although this description sets forth specific details, it is understood that certain embodiments of the disclosure may be practiced without these specific details. It is also understood that in some instances, well-known circuits, components and techniques have not been shown in detail in order to avoid obscuring the understanding of the invention.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
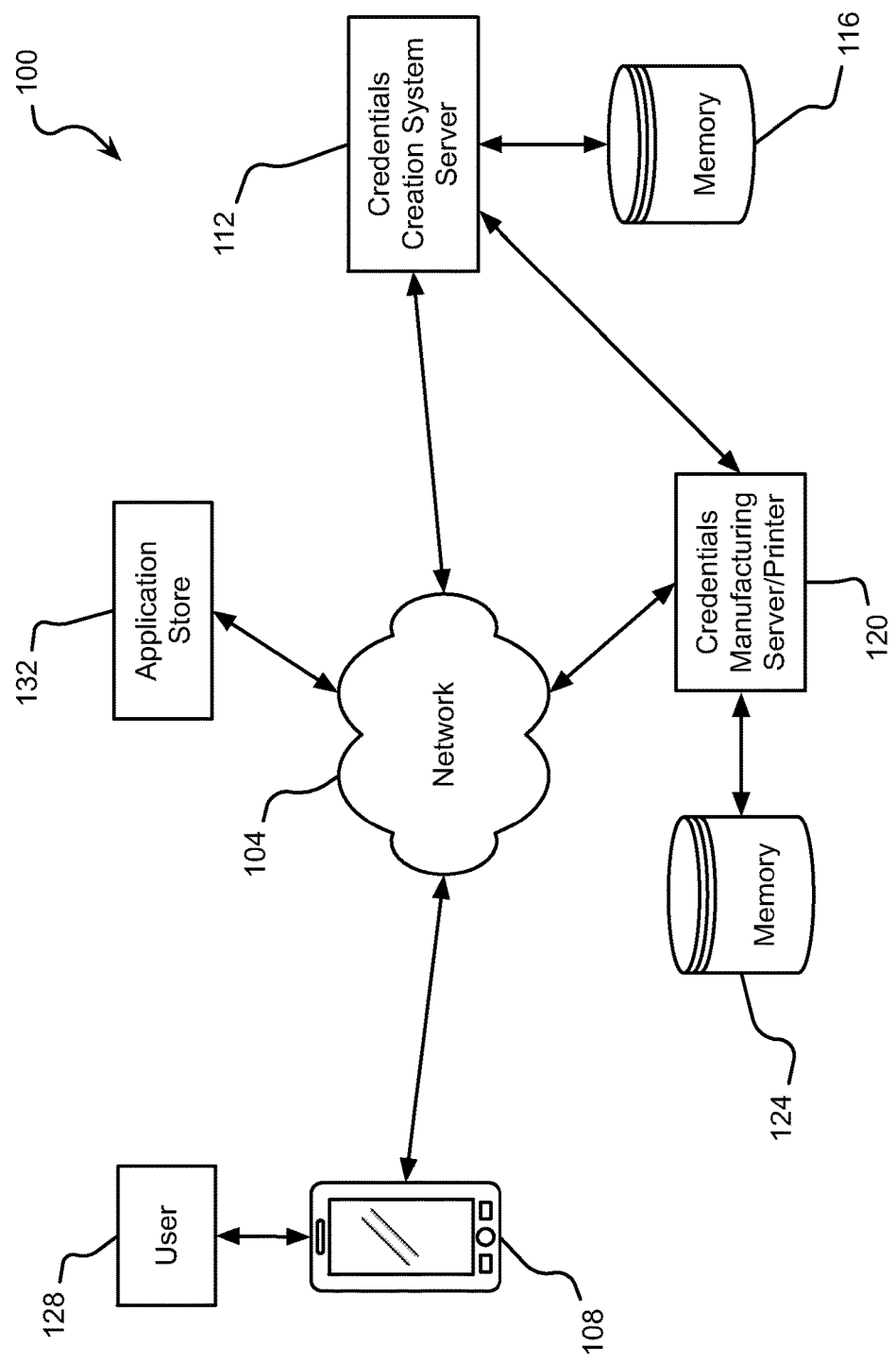
FIG. 1 is a block diagram of a communication system in accordance with embodiments of the present disclosure.

FIG. 1 shows a block diagram of a communication system 100 in accordance with embodiments of the present disclosure. The communication system 100 generally comprises a communication network 104, a mobile device 108, a user 128, a credentials creation system server 112, a memory 116 associated with the credentials creation system server 112, a credentials manufacturing server 120, a memory 124 associated with the credentials manufacturing server 120, and an application store 132. As can be appreciated, one or more mobile devices 108 may access the credentials creation system server 112, the credentials manufacturing server 120, and/or the application store 132 and associated memory 116, 124 via the communication network 104 and/or via direct connection.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication media such as coaxial cable, copper cable/wire, fiber-optic cable, antennas for transmitting/receiving wireless messages, and combinations thereof.

The mobile device 108 may comprise any type of known communication equipment or collection of communication equipment operatively associated with at least one communication module and antenna, or transceiver. In some cases, the mobile device 108 may comprise a secure element. The secure element may be associated with the mobile device 108 and may be configured to securely store credentials, applications, and/or provide for the secure execution of associated applications. In some cases the secure element may reside in a smart card chip, a subscriber identity module ("SIM") card, secure application module ("SAM") card, a secure digital ("SD") card, or other memory configured in a secure environment. Examples of a suitable mobile device 108 may include, but are not limited to, a personal computer, laptop, Personal Digital Assistant (PDA), cellular phone, smart phone, tablet, mobile computing device, handheld radio, or combinations thereof. In general each mobile device 108 may be adapted to support video, audio, text, and/or data communications with other mobile devices 108 as well as one or more communication device, and/or servers 112, 120, 132. The type of medium used by the mobile device 108 to communicate with other communication devices or servers 112, 120, 132 may depend upon the communication applications available on the mobile device 108. The mobile device 108 may correspond to a communication device associated with a user 128. It is anticipated that the mobile device 108 may comprise at least one secure memory, or memory that is capable of being at least partially secured. In one embodiment, the at least one secure memory may be used to store security keys, codes, identities, and/or other data that may be used by the mobile device 108 to communicate with a credentials creation system server 112, a credentials manufacturing server 120, an application store 132, a recipient, combinations thereof, and/or other devices. As used herein, the secure memory may correspond to computer memory that is logically and/or physically secure. Examples of logically secure memory include a Trusted Execution Environment whereas examples of a physically secure memory include a secure element. Combinations of logically and physically secure memory are also well known in the art.

A credentials creation system server 112, in accordance with embodiments of the present disclosure, may comprise a communication server or other dedicated processor that functions to provide services to devices (e.g., mobile devices 108, communication devices, etc.). A user 128 of the mobile device 108 may employ various applications on the server 112 and/or on the mobile device 108 to at least provide credentials creation communication functionality as disclosed herein.

The credentials creation system server 112 may be associated with a server memory 116. In some embodiments, the server memory 116 may be configured to store information relating to one or more users 128, manufacturing information, security system preferences, standards, security information, mobile devices 108, permissions, encryption, user data, identification, location information, communication links, and the like. An administrative user may have access to the credentials creation system server 112 and associated server memory 116 to manipulate data stored thereon. Among other things, an administrative user may view, register, modify, and/or cancel information associated with a user 128 and/or mobile device 108 via the server 112 and its associated memory 116. In some cases, the administrative user may override orders placed and/or information entered by a user 128 via an application running on the credentials creation system server 112. It is anticipated that a mobile device 108 may navigate to and communicate across a communication network 104 with the credentials creation system server 112 and associated memory 116 by presenting a network address to the mobile device 108, including but not limited to, an NFC tag, barcode, QR code, and URL. In some cases, information associated with a specific user 128 may be stored in the associated memory 116 and/or associated with the presented network address.

A credentials manufacturing server 120, in accordance with embodiments of the present disclosure, may comprise a communication server or other dedicated processor that functions to communicate with at least one manufacturing resource in the production of access credentials for one or more users 128. Additionally or alternatively, the credentials manufacturing server 120 may communicate with a credentials creation system server 112. In some embodiments, the credentials manufacturing server may receive order instructions from the credentials creation system server 112. The order instructions may include user information that can be used in manufacturing access credentials for a user 128. It is anticipated that the credentials manufacturing server 120 may at least provide a manufacturing status of a user's access credentials to a credentials creation system server 112 and/or a user 128. In some embodiments this status may be provided automatically, while in other embodiments the status may be provided in response to a query initiated by a user 128 and/or a credentials creation system server 112.

Among other things, the credentials manufacturing server 120 may be associated with a server memory 124. The server memory 124 may be configured to store information relating to manufacturing instructions, user credentials manufacturing status, manufacturing facility status, and the like. As can be appreciated, various applications on the server 120 at least provide the credentials manufacturing functionality as disclosed herein. In at least one embodiment, the functionality of the credentials creation system server 112 and the credentials manufacturing server 120 may be operated via a single server.

In some embodiments, an application store 132 may be provided. The application store 132 may be configured to allow a mobile device 108 to retrieve at least one application for use in the access credentials creation disclosed herein. The at least one application can be any higher level software that executes particular access credentials creation functionality for a user 128. In some embodiments, the application store 132 may represent any memory or data storage, and the management software associated therewith, for storing the at least one application. Additionally or alternatively, the application store 132 may be accessed by a mobile device 108 across a network 104 by providing the mobile device 108 with a network address of the application store 132. In some cases, the application store 132 may be private. In other words, the network address of the application store 132 may be hidden, or separately located, from one or more of a public network, the Internet, unauthorized users, and the like.

Figure 2:
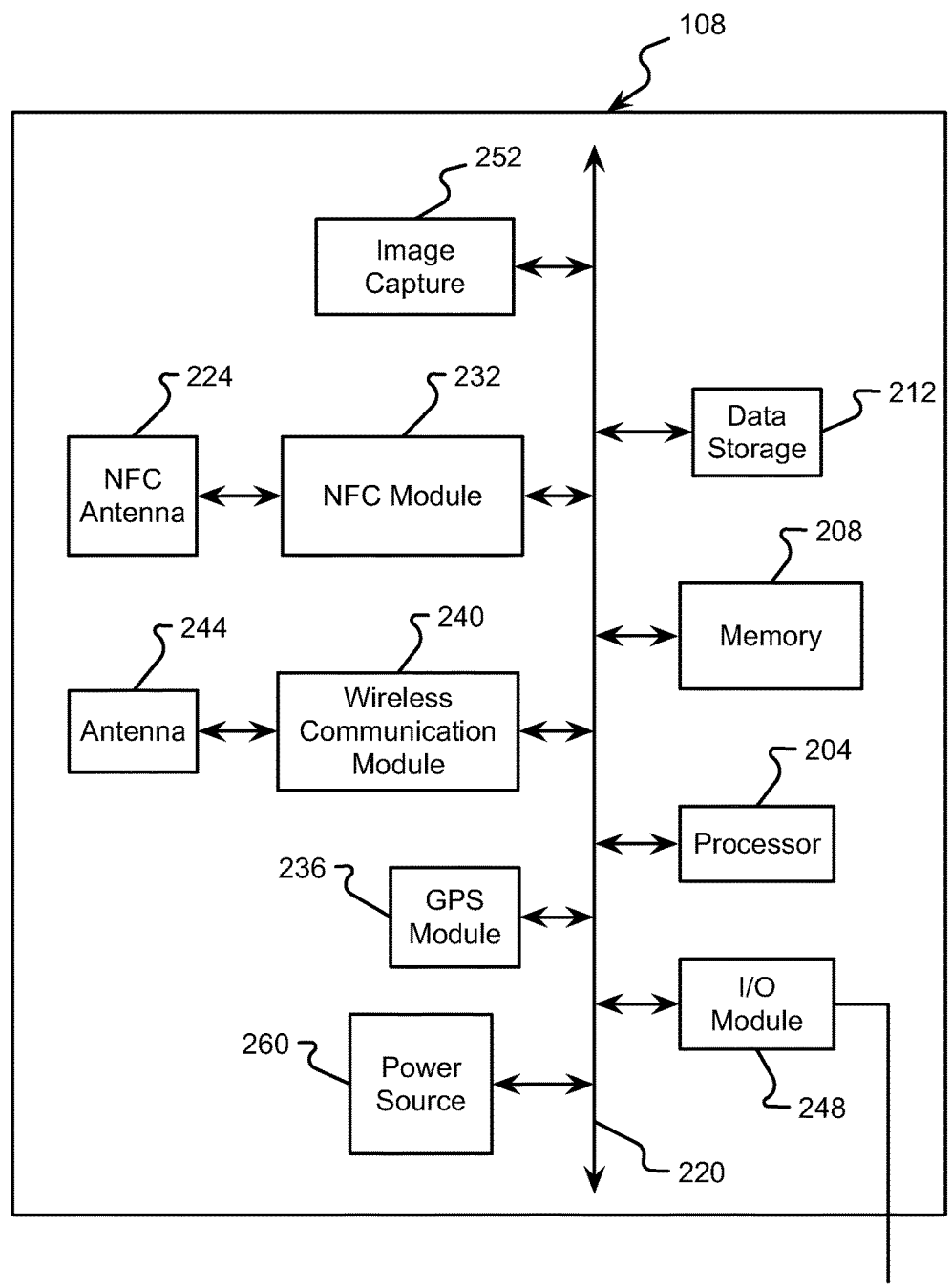
FIG. 2 is a block diagram of an embodiment of the hardware of the mobile device.

FIG. 2 illustrates components of a mobile device 108 in accordance with embodiments of the present disclosure. In general, the mobile device 108 may comprise one or more of a processor 204, memory 208, data storage 212, NFC module 232, NFC antenna 224, an image capture interfaces/devices 252, and a power source 260. Some embodiments of the mobile device 108 may additionally include a Global Positioning System ("GPS"), or equivalent geographical location module, 236, wireless communication module 240, antenna 244, Input/Output ("I/O") module 248, and more. In some cases the mobile device 108 may comprise various NFC components that form an NFC transceiver (e.g., NFC antenna 224, NFC module 232, power source 260, and/or a processor 204 etc.).

The processor 204 may comprise a general purpose programmable processor or controller for executing application programming or instructions. In accordance with at least some embodiments, the processor 204 may include multiple processor cores, and/or implement multiple virtual processors. In accordance with still other embodiments, the processor 204 may include multiple physical processors. As a particular example, the processor 204 may comprise a specially configured application specific integrated circuit (ASIC) or other integrated circuit, a digital signal processor, a controller, a hardwired electronic or logic circuit, a programmable logic device or gate array, a special purpose computer, or the like. The processor 204 generally functions to run programming code or instructions implementing various functions of the mobile device 108.

A mobile device 108 may also include memory 208 for use in connection with the execution of application programming or instructions by the processor 204, and for the temporary or long term storage of program instructions and/or data. As examples, the memory 208 may comprise RAM, DRAM, SDRAM, or other solid state memory. Alternatively or in addition, data storage 212 may be provided. Like the memory 208, the data storage 212 may comprise a solid state memory device or devices. Alternatively or in addition, the data storage 212 may comprise a hard disk drive or other random access memory.

The mobile device 108 may include at least one NFC chip, or module, 232 and at least one associated NFC antenna 224. As can be appreciated, the NFC chip/module 232 may comprise one or more of the NFC antenna 224 and at least one secure element. In some embodiments, the NFC module 232 may be configured to produce a magnetic field via the NFC antenna 224. This magnetic field produced by the NFC module 232 and antenna 224 may be configured to induce corresponding electrical activity in an NFC tag. In turn, a passive NFC tag may generate its own a radio field, using the power borrowed from the mobile device 108 that may be supplied via the magnetic field. It is an aspect of the present disclosure that the NFC module 232 and NFC antenna 224 may detect and even interpret the radio field (e.g., within the NFC range, 13.56 MHz) produced by the NFC tag. In some cases, the radio field produced by the NFC tag may initiate one or more applications and/or features used by the mobile device 108.

In addition, the NFC module 232 may include security features that may be employed to encrypt, decrypt, and/or store secure information. In some embodiments, the NFC module 232 may communicate with other components of the mobile device 108 and/or communication system 100 to prepare and exchange data.

In support of communications functions or capabilities, the mobile device 108 can include a wireless communication module 240. As examples, the wireless communication module 240 can comprise a GSM, CDMA, FDMA and/or analog cellular telephony transceiver capable of supporting voice, multimedia and/or data transfers over a cellular network. Alternatively or in addition, the wireless communications module 240 can comprise a Wi-Fi, BLUETOOTH™, WiMax, infrared, or other wireless communications link. The wireless communications module 240 can be associated with a shared or a dedicated antenna 244.

An I/O module 248 and associated ports may be included to support communications over wired networks or links, for example with other communication devices, server devices, and/or peripheral devices. Examples of I/O include an Ethernet port, a Universal Serial Bus (USB) port, Institute of Electrical and Electronics Engineers (IEEE) 1394, or other interface.

The mobile device 108 can also include a satellite positioning system, or geographical location system, module/receiver 236 such as the Global Positioning System ("GPS") (US), GLONASS (Russia), Galileo positioning system (EU), Compass navigation system (China), and Regional Navigational Satellite System (India). In accordance with embodiments of the present invention, a GPS receiver may further comprise a GPS module 236 that is capable of providing absolute location information to other components of the mobile device 108 and/or communication system 100. In some embodiments, a geographical location of the mobile device 108 may be determined by the device's location-based features, a location signal, and/or combinations thereof. The location-based features, and corresponding module 236, may utilize data from one or more satellite positioning systems (e.g., GPS), WiFi access points, cell towers, and the like.

One or more image capture interfaces/devices 252, such as a camera, can be included for capturing still and/or video images. Alternatively or additionally, an image capture interface/device 252 can include a scanner or code reader. An image capture interface/device 252 can include or be associated with additional elements, such as a flash or other light source. As can be appreciated, a mobile device 108 may have a plurality of image capture interfaces/devices 252. In some embodiments, an image capture interface/device 252 may be located on a side of the mobile device 108 such that a user 128 may view and even align a live image of the user 128 on a screen associated with the mobile device 108. In one embodiment, this image capture interface/device 252 arrangement may be equivalent to the front-facing camera found on smart phones, tablets, PCs, etc.

Communications between various components of the mobile device 108 may be carried by one or more buses 220. Moreover, power can be supplied to the components of the mobile device 108 from a power source and/or power control module 260. The power control module 260 may, for example, include a battery, an AC to DC converter, power control logic, and/or ports for interconnecting the mobile device 108 to an external source of power.

Figures 3A, 3B:
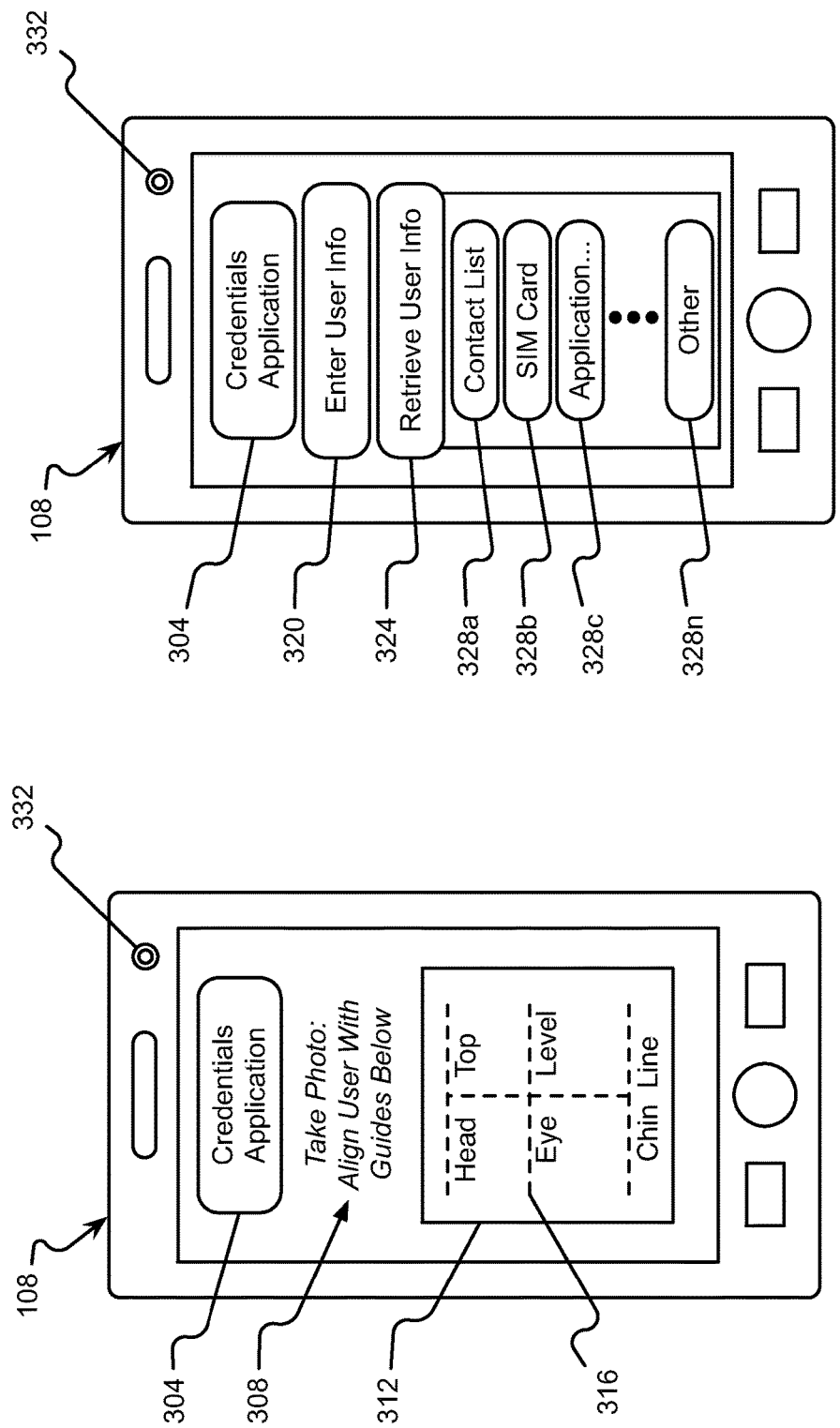
FIG. 3A shows a mobile device with an access credentials application in a first state in accordance with embodiments of the present disclosure.
FIG. 3B shows a mobile device with an access credentials application in a second state in accordance with embodiments of the present disclosure.

Referring now to FIG. 3A, a mobile device 108 is shown with an access credentials application 304 in a first state in accordance with embodiments of the present disclosure. Upon initiation, the access credentials application 304 may provide a user 128 with a prompt 308 for user 128 input (e.g., collected information, etc.). For example, a security system may require the enrollment of a photograph of the user 128 for the purposes of identification. In this example, an image capture interface/device 252 may be initiated, and a photograph window 312 may appear on the mobile device 108 display. Continuing with this example, an image may be captured via a front facing camera element 332 such that a user 128 may align specific features with one or more guides 316 in the photograph window 312. In some embodiments, the user 128 may perform the alignment to the one or more guides 316 using a live image. Additionally or alternatively, the user 128 may align features of a photograph captured by the image capture interface/device 252 of a stored image. In yet another embodiment, the access credentials application 304 may automatically align a photograph of a user to suit the requirements of a security system. As can be appreciated, some security systems may require a clear view of at least one feature of a user 128, including but not limited to, a user's eyes, nose, chin, ears, face, facial hair, and combinations thereof.

In some embodiments, the input provided by a user 128 may be checked and/or verified to ensure that the collected information is suitable for use with the access credentials and/or the security system. This verification check may be performed automatically via the access credentials application 304 running via the mobile device 108. Additionally or alternatively, the verification check may be automatically performed via the credentials creation system server 112.

FIG. 3B shows a mobile device 108 with an access credentials application 304 in a second state in accordance with embodiments of the present disclosure. In general, FIG. 3B shows an access credentials application 304 requesting user 128 information from a user 128 of the mobile device 108. In one embodiment, the user 128 may provide such information to the access credentials application 304 via at least one input method. For example, a user 128 may enter information that is subsequently stored by the access credentials application 304. In some embodiments, information may be entered via a physical or virtual keyboard associated with the mobile device 108. Additionally or alternatively, information may be retrieved from the memory 208, data storage 212, and/or some other memory associated with an application of the mobile device 108. Such information may be retrieved by a user 128 interfacing with a mobile device 108 GUI.

In some embodiments, an access credentials application 304 may include an enter input button 320. A user 128 may select the enter input/information button 320 by, among other things, pressing the button 320 via the GUI on the mobile device 108. Once selected, the user 128 may be presented with another display layout that may include one or more data fields for data entry. Such data fields may be directed to information about a user 128, which may include, but are in no way limited to, first name, last name, title, department, identification number, address, contact information, and the like.

Additionally or alternatively, an access credentials application 304 may include a retrieve information button 324. The retrieve information button 324 may retrieve user 128 information from a contact list 328a, a SIM card 328b, an application 328c, and/or other memory associated with a mobile device 108 and or user 128. For instance, a user 128 may maintain address and contact information in a contact list 328a. In any event, the user 128 information may be retrieved and selected to populate data fields required by the access credentials application 304. As can be appreciated, the information may be retrieved and caused to automatically populate data fields by the access credentials application 304. In some embodiments, user 128 information may be associated with registration information of a mobile device 108. For example, the user 128 ownership information of a mobile device 108 may be stored in a memory 208 or data storage 212 on the mobile device 108.

Figure 4:
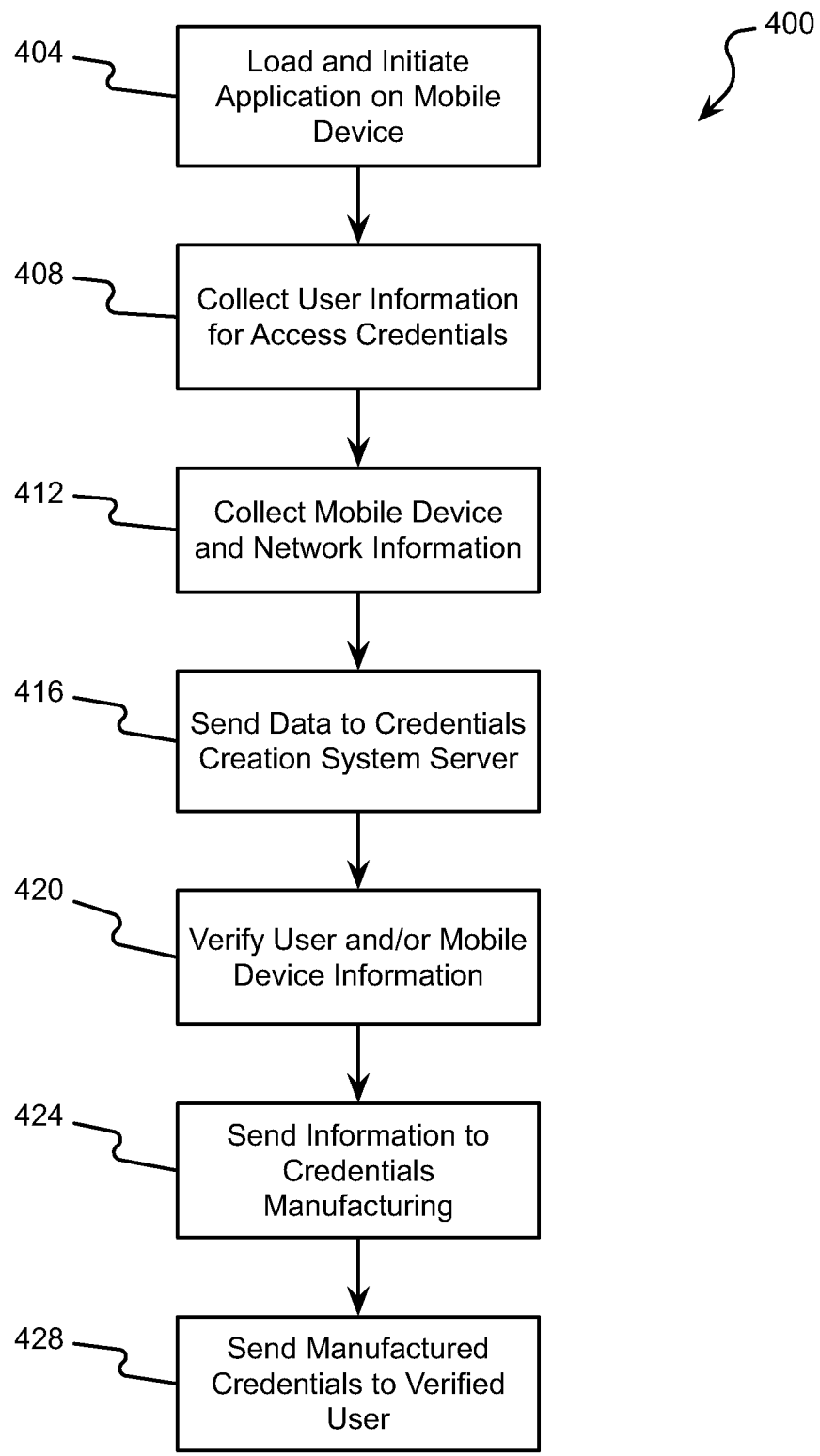
FIG. 4 is a flow diagram depicting a first access credentials manufacturing method in accordance with embodiments of the present disclosure.

FIG. 4 is a flow diagram depicting a first credential manufacturing method 400 in accordance with embodiments of the present disclosure. The method 400 begins at step 404 when an access credentials application 304 is initiated via a mobile device 108. In one embodiment, an access credentials application 304 may be initiated by a user 128 activating an application on a mobile device 108. In some embodiments, an access credentials application 304 may be configured to initiate upon receiving a signal from an NFC tag. In other words, when the mobile device 108 is presented to an NFC tag, the magnetic field produced by the mobile device 108 allows the NFC tag to generate a radio field that is detected by the mobile device 108. This radio field may include instructions that are interpreted by the mobile device 108, to open the access credentials application 304 on the mobile device 108. As a result, the access credentials application 304 may communicate across the communication network 104 to communicate with one or more of a credentials creation system server 112, a credentials manufacturing server 120, an application store 132, and the like. Additionally or alternatively, an access credentials application 304 may be initiated by scanning a QR code, barcode, or other code via the mobile device 108.

The method 400 continues by collecting information about a user 128 (step 408). It is anticipated that information collected about a user 128 may be used to manufacture access credentials for the user 128. In some embodiments, the collected information may include at least one of a user 128 photograph, voice print, biometric data, password, pass key, name, address, contact information, title, department, group, security level, and other identification characteristics associated with a user 128. As can be appreciated, the information can be collected by the one or more components of a mobile device 108 (e.g., an image capture interface/device 252, I/O module 248, etc.).

In some embodiments, an access credentials application 304 may collect information associated with a mobile device 108 and/or communication network 104 used by the mobile device 108 (step 412). This information may include, but is not limited to, a Media Access Control ("MAC") address of the device 108, hardware version and/or information, software version and/or information, firmware version and/or information, Internet Protocol ("IP") address used by the device 108, and the like. Among other things, the mobile device 108 information may be used to verify user 128 information collected and/or permissions associated with a user 128.

Once the user 128 and/or mobile device 108 information is collected, it may be sent to the credentials creation system server 112 (step 416). In one embodiment, the information may be aggregated before it is sent to the server 112. The mobile device 108 may utilize a wireless communication module 240 to send the collected information across a network 104 to the server 112. The access credentials application 304 may utilize components (e.g., the wireless communication module 240, antenna 244, memory 208, and/or data storage 212, etc.) associated with the mobile device 108 to access the credentials creation server 112. Additionally or alternatively, the collected information may be encrypted before it is sent to the server 112.

At step 420, the sent collected information may be verified for authenticity, accuracy, and/or sufficiency. The server 112 may use mobile device 108 information (e.g., MAC address, stored data, user data, etc.) to determine an authentication of the mobile device user 128. In some cases, the user 128 may be verified by comparing collected information to one or more stored information. The stored information may be maintained on the memory 116 associated with the access credentials system server 112 (e.g., from previous data entry, administrative data, etc.). In other embodiments, the stored information may be maintained on a memory 208 and/or data storage 212 associated with the mobile device 108.

Additionally or alternatively, the verification process may include, but is not limited to, accessing a GPS module 236, and/or stored data, to verify a current, and/or past, location of the mobile device 108. As can be appreciated, this location verification process may act as a security check to ensure that a user 128 is physically located at a specific position specified by at least one data structure used by the access credentials application 304. In one embodiment, the location information associated with an entered data field may be compared to the location information associated with a mobile device 108 to determine a qualifying match (e.g., a geo-location within a given threshold, etc). Among other things, the location verification process can thwart possible security bypass techniques that may be employed by a computer, or network, hacker who may attempt to gain access to information stored in the credentials creation system server 112 and/or associated memory 116.

The method 400 may continue by sending the information in a suitable format to the credentials manufacturing server 120 (step 424). In some embodiments, the information may be formatted for manufacturing. This formatting may include accompanying order instructions, company standards, layouts, mailing address and the like. Once the access credentials are manufactured the credentials may be shipped to a user 128 and/or security administrator (step 428).

Figure 5:
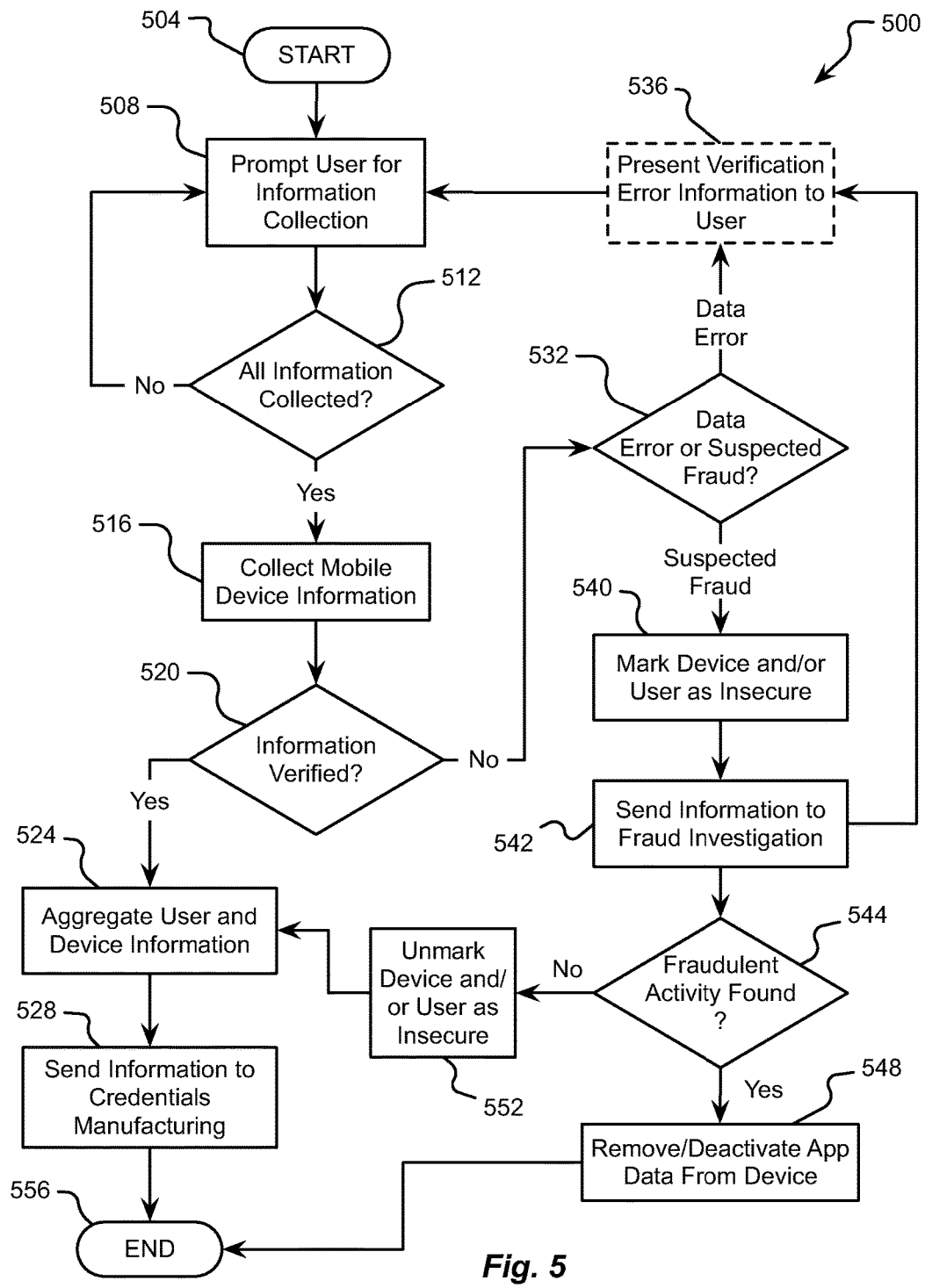
FIG. 5 is a flow diagram depicting a first access credentials application method operated via a mobile device in accordance with embodiments of the present disclosure.

FIG. 5 shows a flow diagram depicting a first access credentials application method 500 operated via a mobile device 108 in accordance with embodiments of the present disclosure. The method 500 begins at step 504 and proceeds when a user 128 is prompted for information (step 508) via an access credentials application 304. In some embodiments, the access credentials application 304 may be downloaded to the mobile device 108 via an application store 132. In other embodiments, the access credentials application 304 may be stored on a credentials creation system server 112 in communication with the mobile device 108. The mobile device 108 may run the credentials application 304 via the credentials creation system server 112.

In some embodiments, the prompt for user information may include providing one or more data fields for entry by a user 128. Among other things, the data fields may represent information about a user 128 in the form of at least one alphanumeric entry, image, voice print, biometric entry, and combinations thereof. For example, a user may be prompted to take a photograph, enter identification information (e g, name, social security number, address, etc.), security information (e.g., password, pass phrase, pass key, Personal Identification Number ("PIN")), record a voice sample, and the like.

The method 500 continues by determining whether all of the required information has been collected and/or entered by the user 128 (step 512). In other words, rules may be associated with an access credentials application 304 to provide that one or more data fields (for collected information) are required. In the event that the access credentials application 304 determines that information associated with a required data field has not been collected, the method 500 may return to prompting the user 128 for the information. In one embodiment, the information may have been entered by a user 128, but it is not sufficient for use by the access credentials application 304. In this case, the user 128 may be prompted to enter the information in accordance with sufficiency rules associated with the access credentials application 304. In any embodiment, a prompt may be accompanied by a message stating that the required information was not collected.

If the access credentials application 304 determines that all of the information has been collected in accordance with any rules associated with the application 304, the method 500 may continue by collecting mobile device 108 information (step 516). Mobile device 108 information may include data associated with the mobile device 108 and/or network accessed by the mobile device 108. Among other things, mobile device 108 information may include at least one of, location data (e.g., via GPS, wireless, cell tower, combinations thereof, and/or equivalent location services), a MAC address, hardware information (e.g., version, registration information, manufacturer, etc.), software information (e.g., operating system version, application version, registration information, etc.), and the mobile device's 108 accessed network information. Collection of the mobile device 108 information may be performed automatically via the access credentials application 304, and may even be performed surreptitiously (i.e., without user 128 interference and/or knowledge).

In some embodiments the access credentials application 304 may verify the collected information (step 520). Verification of the collected information may include one or more checks of the data comprising the collected information. In one embodiment, the one or more checks may include comparing the collected information with stored data, other collected information, and/or analyzing the collected data using one or more rules. For example, a first verification check may involve comparing the user 128 collected information against the mobile device 108 collected information. In this example, a name and address entered by a user 128 may be verified by comparing the name and address with a name and address stored in the mobile device 108 information collected (e.g., registration information). As another example, a second verification check may retrieve user information from a memory, whether locally or remotely located, to perform the second verification check. This verification may be performed via the access credentials application 304. It is anticipated that the verification may include a plurality of checks on the collected information.

In the event that the information is sufficiently verified, the method 700 continues by optionally aggregating the user and device information (step 524). In some embodiments, the optional aggregation step may involve preparing the information for transmission in accordance with rules associated with a destination. For instance, a destination (e.g., a credentials manufacturing server) may require user information to be formatted and/or arranged in a specific order. In this example, a user's 128 last name may be located in a first position of a data structure, while the user's 128 first name may be located in a second position of the data structure. As can be appreciated, the information can be preconfigured by the access credentials application 304 to provide user 128 information in an arrangement that enables a destination to properly receive and interpret the information.

Once the information is at least verified and/or aggregated, it may be sent to a destination, such as a credentials manufacturing server 120 (step 528). Sending the information to a destination may include employing encryption techniques, specific and/or secure transfer protocols (e.g., TCP/IP, SCTP, etc.), accessing a public network, accessing a private network, and combinations thereof. In one example the user 128 information may be sent to a credentials manufacturing server 120. In some embodiments, the credentials manufacturing server 120 may include a server in communication with at least one credentials manufacturing resource. As can be appreciated, the credentials manufacturing resource may be a printer, a manufacturing line, a credentials assembly system, production equipment, and the like. In one embodiment, the method 500 may end after information has been sent to the credentials manufacturing server 120 (step 556).

In some embodiments, the method 500 continues when the information verification, performed at step 520, yields a negative verification response (step 532). Among other things, the access credentials application 304 may determine whether the information verification yielded a negative response due to a data error or suspected fraud. Examples of a data error may include misspelled names, addresses, titles, etc. Additionally or alternatively, a data error may include a null entry in a data field (e.g., a required field, etc.). In yet another example, a data error may include a data entry that fails to match criteria specified for the data field.

In any event, if the information verification failed due to a data error, the method may present a message to a user 128 via the mobile device 108 (step 536). The message may be configured to provide one or more details relating to the data error. For instance, the message may explain the data error and suggest how the user may overcome the data error in verification. Accordingly, the method 500 may proceed by returning to step 508 and prompt the user 128 for information.

In some embodiments, the access credentials application 304 may determine that the information verification, performed at step 520, provides a negative verification response due to suspected fraud. Depending on the type of error in verification and/or data entry, the access credentials application 304 may be configured to treat specific circumstances surrounding an error as suspected fraud. An example of suspected fraud may include a scenario where a user 128 has entered information into one or more data fields of the device that does not match one or more data fields found in comparison data fields. For example, a user 128 may enter a name in the "name" data field of the access credentials application 304 via the mobile device 108. As disclosed herein, the access credentials application 304 may retrieve a username associated with the mobile device 108 from a memory associated with the device. In the event the names are dissimilar, within a given threshold, the mismatch may suggest fraud on behalf of the user 128.

If fraud is suspected, the method 500 may continue by marking the mobile device 108 and/or the user 128 as insecure (step 540). As a precautionary step, the application 304 may initially mark the device 108 and/or user 128 as insecure to prevent the device 108 from proceeding with manufacturing access credentials until the suspected fraud is investigated. In the event that the device 108 is marked as insecure, at least one identifying characteristic (e.g., MAC address) of the device 108 may be recorded in a memory along with an identification of the device 108 being insecure. In the event that a user 128 is marked as insecure, at least one identifying characteristic (e.g., name, ID number, etc.) of the user 128 may be recorded in a memory along with an expression of the user 128 being insecure (one or more binary digit may be used as an expression that can indicate security).

Once the device 108 and/or user 128 is marked as insecure, the collected information, including any information relevant to the suspected fraud, may be sent to fraud investigation (step 542). Additionally, an optional message may be presented to a user 128 describing the suspected fraud, that the device 108 and/or user 128 have been marked as insecure, and/or providing other information (step 536). Fraud investigation may correspond to one or more subsequent automatic verification checks performed automatically via the access credentials application 304 or some other server 112, 120. In some embodiments, fraud investigation may include a group of one or more human agents who may receive information from a mobile device 108 across a network 104 via a communication device. As can be appreciated, the human agents may analyze instances of suspected fraud via a combination of fraud investigation algorithms associated with the communication device. In one embodiment, fraud investigation may involve a combination of the subsequent automatic verification checks and human agent analysis of the information.

Next, the fraud investigation may yield a result as to whether the instance of suspected fraud qualifies as fraudulent activity (step 544). Fraudulent activity may be found by engaging in a comparison of collected information to stored information, location data associated with the device 108, repeat failed attempts to enter data, etc. In the event that no fraudulent activity is found, the method 500 may continue by unmarking the device 108 and/or user 128 as insecure and proceeding by preparing the information for sending to a destination (step 552).

In some instances, however, the fraud investigation may determine that fraudulent activity is found, and as such, may proceed to take one or more precautionary measures (step 548). For example, the access credentials application 304 may deactivate a communications ability of the mobile device 108. In one embodiment, the access credentials application 304 may deactivate the application 304 from functioning on the mobile device 108. As can be expected, a user 128 may be suspected of fraudulent activity, and may even be restricted from interfacing with any credentials application 304 or server 112, 120 until the restriction is lifted. Once any one or more of the precautionary measures have been taken, the method 500 may end at step 556.

Figure 6:
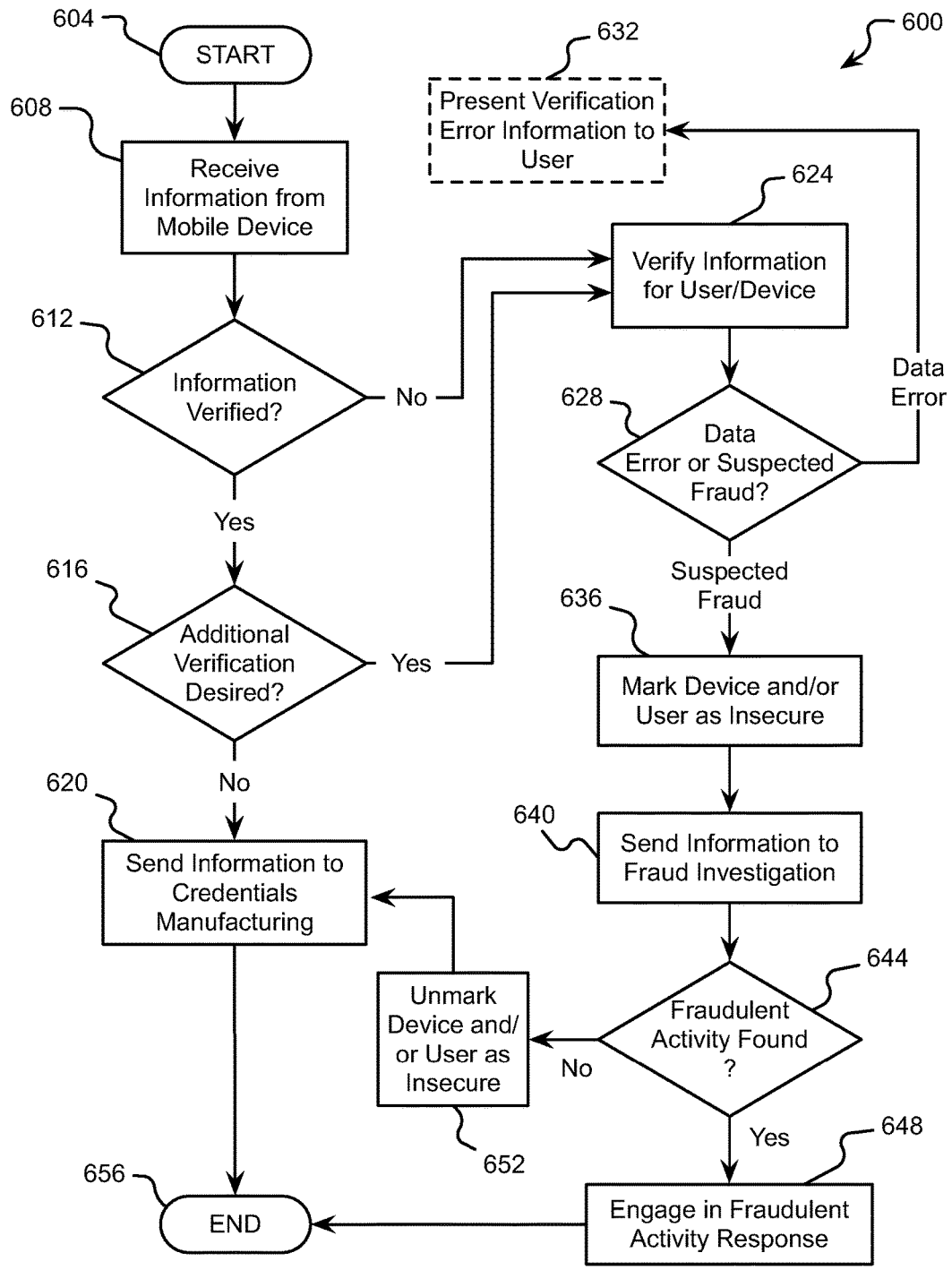
FIG. 6 is a flow diagram depicting an access credentials application method operated via a credentials creation system server in accordance with embodiments of the present disclosure.

Referring to FIG. 6, a flow diagram depicting an access credentials application method 600 operated via a credentials creation system server 112 is shown in accordance with embodiments of the present disclosure. The method 600 begins at step 604 and proceeds when information is received from a mobile device 108 (step 508). As disclosed above, the information may relate to data associated with a user 128 and/or a mobile device 108. In some embodiments, the information may be aggregated and/or arranged for use by a credentials creation system server 112.

The method 600 may continue by determining whether the information received is verified (step 612). In some embodiments, this determination may be made by the server 112 referring to the aggregated information. For example, the aggregated information may contain one or more binary digit information that can be used to indicate a first, second, or more verification performed by an access credentials application 304. Additionally or alternatively, the binary digit information may be used to indicate whether any verification has been performed or not on the information. In the event that the information has not been verified by the access credentials application 304 of the mobile device 108, the method 600 may proceed by performing a verification of the information, whether associated with a user 128 or a mobile device 108 (step 624). The verification performed at step 624 may be similar to the verification disclosed above.

In some embodiments, the information may be verified by an access credentials application 304 via the mobile device 108, and an additional verification may be desired (step 616). If no additional verification is desired, the method may proceed by sending manufacturing information to credentials manufacturing (step 620). The manufacturing information may be sent in the form of an order and associated with a user 108. As can be appreciated, an additional verification may be employed to ensure increased security surrounding the authentication of a user 108. Additional verification may involve subsequent verification checks as disclosed herein.

The method 600 may proceed by verifying the collected information for a user 128 and/or a mobile device 108 (step 624). Verification of the collected information may include one or more checks of the data comprising the received and collected information. In one embodiment, the one or more checks may include comparing the collected information with stored data, other collected information, and/or analyzing the collected data using one or more rules. For example, a verification check may involve comparing the user 128 collected information against the stored information. Other rules may be employed as part of the verification of information. In accordance with embodiments of the present application, user information may be compared against information about a user 128 that is stored with the server 112. It is anticipated that the information verification may include a plurality of checks performed on the collected information via software running on the server 112. As can be appreciated, the verification check performed by the server 112 may be similar to the verification check performed by the access credentials application 304 disclosed above.

In some embodiments, the method 600 continues when the information verification, performed at step 624, yields a negative verification response (step 628). Among other things, the credentials creation system server 112 may determine whether the information verification yielded a negative response due to a data error or suspected fraud. Examples of a data error may include misspelled names, addresses, titles, etc. Additionally or alternatively, a data error may include a null entry in a data field (e.g., a required field, etc.). In yet another example, a data error may include a data entry that fails to match criteria specified for the data field.

In any event, if the information verification failed due to a data error, the method may present a message to a user 128 via the mobile device 108 (step 632). The message may be configured to provide one or more details relating to the data error. For instance, the message may explain the data error and suggest how the user may overcome the data error in verification.

In some embodiments, the credentials creation system server 112 may determine that the information verification, performed at step 624, provides a negative verification response due to suspected fraud. Depending on the type of error in verification and/or data entry, the credentials creation system server, and associated software, may be configured to treat specific circumstances surrounding an error as suspected fraud. An example of suspected fraud may include a scenario where a user 128 has entered information into one or more data fields of the device that does not match one or more data fields found in comparison data fields. For example, a user 128 may enter a name in the "name" data field of the access credentials application 304 via the mobile device 108. As disclosed herein, the credentials creation system server 112 may retrieve a username associated with the mobile device 108 from an associated memory 116. In the event the entered name is dissimilar to the retrieved username, within a given threshold, the mismatch may suggest fraud on behalf of the user 128.

If fraud is suspected, the method 600 may continue by marking the mobile device 108 and/or the user 128 as insecure (step 636). As a precautionary step, the server 112 may initially mark the device 108 and/or user 128 as insecure to prevent the device 108 from proceeding with manufacturing access credentials until the suspected fraud is investigated. In the event that the device 108 is marked as insecure, at least one identifying characteristic (e.g., MAC address) of the device 108 may be recorded in a memory 116 along with an identification of the device 108 being insecure. In the event that a user 128 is marked as insecure, at least one identifying characteristic (e.g., name, ID number, etc.) of the user 128 may be recorded in a memory along with an expression of the user 128 being insecure (one or more binary digit may be used as an expression that can indicate security).

Once the device 108 and/or user 128 is marked as insecure, the collected information, including any information relevant to the suspected fraud, may be sent to fraud investigation (step 640). Fraud investigation may correspond to one or more subsequent automatic verification checks performed automatically via the credentials creation system server 112. In some embodiments, fraud investigation may include a group of one or more human agents associated with a communication device who may receive information from the credentials creation system server 112 across a network 104. As can be appreciated, the human agents may analyze instances of suspected fraud via a combination of fraud investigation algorithms associated with the communication device. In one embodiment, fraud investigation may involve a combination of the subsequent automatic verification checks and human agent analysis of the information.

Next, the fraud investigation may yield a result as to whether the instance of suspected fraud qualifies as fraudulent activity (step 644). Fraudulent activity may be found by engaging in a comparison of collected information to stored information, location data associated with the device 108, repeat failed attempts to enter data, etc. In the event that no fraudulent activity is found, the method 600 may continue by unmarking the device 108 and/or user 128 as insecure and proceeding by preparing the information for sending to a destination (step 652).

In some instances, however, the fraud investigation may determine that fraudulent activity is found, and as such, may proceed to take one or more precautionary measures (step 648). For example, the credentials creation system server 112 may deactivate a communications ability of the mobile device 108. Additionally or alternatively, the credentials creation system server 112 may block communications from a mobile device 108. In one embodiment, the credentials creation system server 112 may deactivate the application 304 from functioning on the mobile device 108. As can be expected, a user 128 may be suspected of fraudulent activity, and may even be restricted from interfacing with any credentials application 304 or server 112, 120 until the restriction is lifted. Once any one or more of the precautionary measures have been taken, the method 600 may end at step 656.

Figure 7:
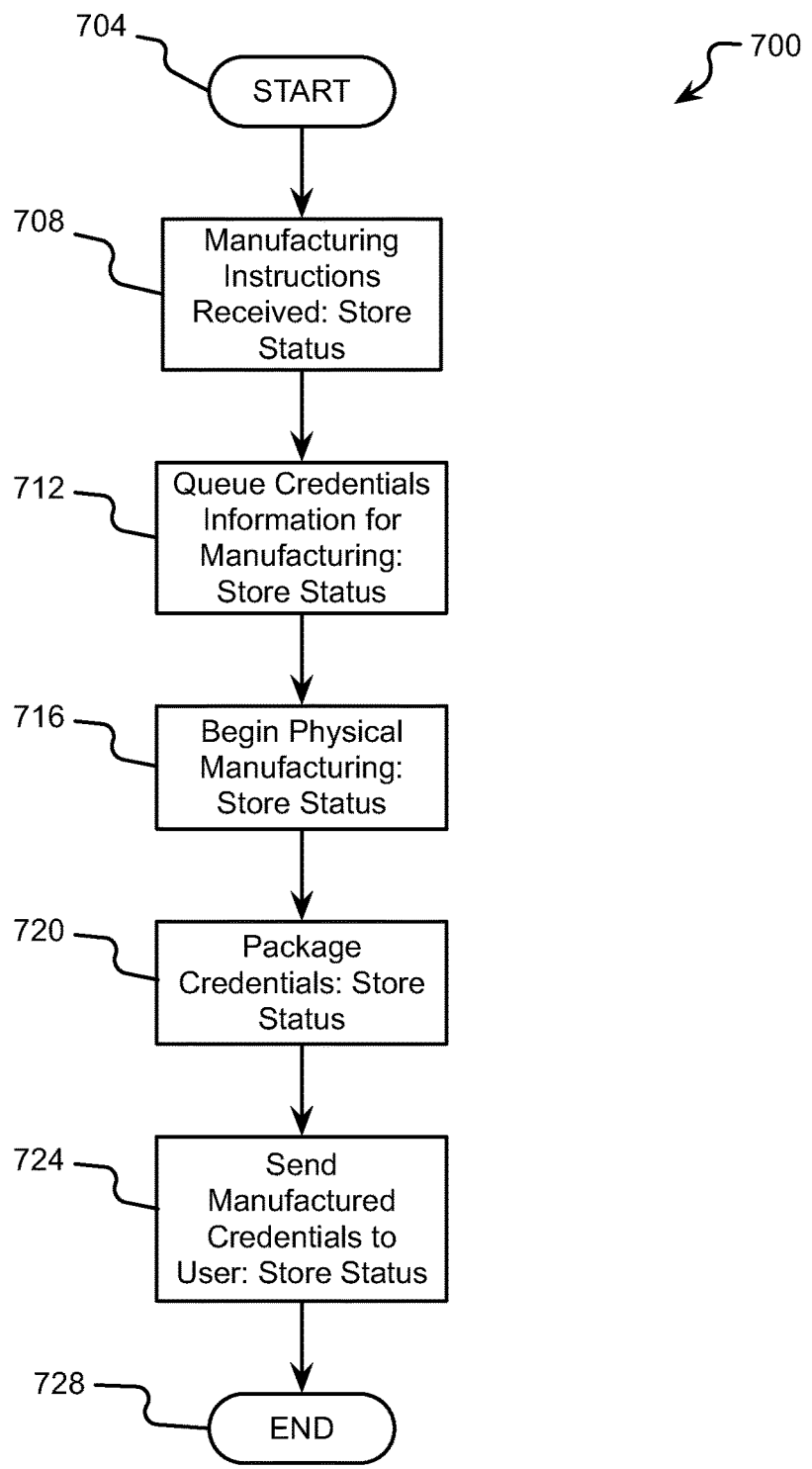
FIG. 7 is a flow diagram depicting an access credentials application method operated via a credentials manufacturing server in accordance with embodiments of the present disclosure.

FIG. 7 is a flow diagram depicting an access credentials application method 700 operated via a credentials manufacturing server 120 in accordance with embodiments of the present disclosure. The method 700 begins at step 704 and proceeds when manufacturing instructions are received (step 708). In one embodiment, manufacturing instructions may be received directly from a mobile device 108. In other embodiments, manufacturing instructions may be received via a credentials creation system server 112. In any event, the manufacturing instructions may comprise an order. The order may include specific manufacturing guidelines and may be associated with a user 128. Once the manufacturing instructions, or order, is received, the credentials manufacturing server 120 may store the status of the order in a memory 124.

Among other things, the status of an order may include details relating to a status of the credentials manufacturing process. In some embodiments, a status may include one or more of a time associated with the manufacturing (e.g., process time, expected completion, time in queue, etc.), associated user information, manufacturing messages, administrative messages, process holds, user 128 request history, available user actions, and the like. For example, an order may be received by a manufacturing server 120 at 9:30 am (EST) on Tuesday, Jan. 15, 2013. Accordingly, the status may list this receiving time, with an expected completion date, list any administrative or manufacturing messages, and any available user actions. One example of a user action may be to cancel and/or modify the order. As can be appreciated, depending on the stage of manufacturing, user actions may be expanded or limited. For instance, a user 128 may only be able to view a status of an order after credentials have been manufactured and are prepared for shipping. At this point, the user may not be able to modify the order, and may not be provided with that user action.

Once the order is received by the manufacturing server 120, the order can be queued for manufacturing (step 712). In some embodiments, a manufacturing queue position may be affected by administrative input and/or an urgency level associated with the order. At any point of this step, the status of the order may be recorded in a memory 124.

The method 700 continues when the order is ready for physical manufacturing (step 716). During the physical manufacturing of the access credentials, it is anticipated that identification information associated with a user 128 can be integrated with the access credentials. In some cases, the identification information may take the form of one or more printed images on a credential. In some embodiments the manufacturing process may include the physical assembly of access credentials for a user 128 comprising one or more of a printed media, a substrate, a chip, a memory, an antenna, and embedded security information. The status of the order at this step may be recorded in a memory 124.

After the access credentials have been physically manufactured, it may be packaged for shipping (step 720). The packaging may include security features and/or security documentation. In one embodiment, the packaging may be configured to prevent or detect tampering. The status of the order at this stage may be recorded in a memory 124.

The access credentials, once packaged, may be sent to a physical destination, or address (step 724). For example, the access credentials may be sent to an address associated with a user 128. In some embodiments, the shipping address may be maintained in the collected information of the access credentials. In other embodiments, the shipping address may be added to an order via an access credentials application 304 or credentials creation system server 112. This address may be an address associated with a security system, building, company, security office, and the like. The status of the order may be recorded in a memory 124 at this stage. The method 700 ends at step 728.

Figure 8:
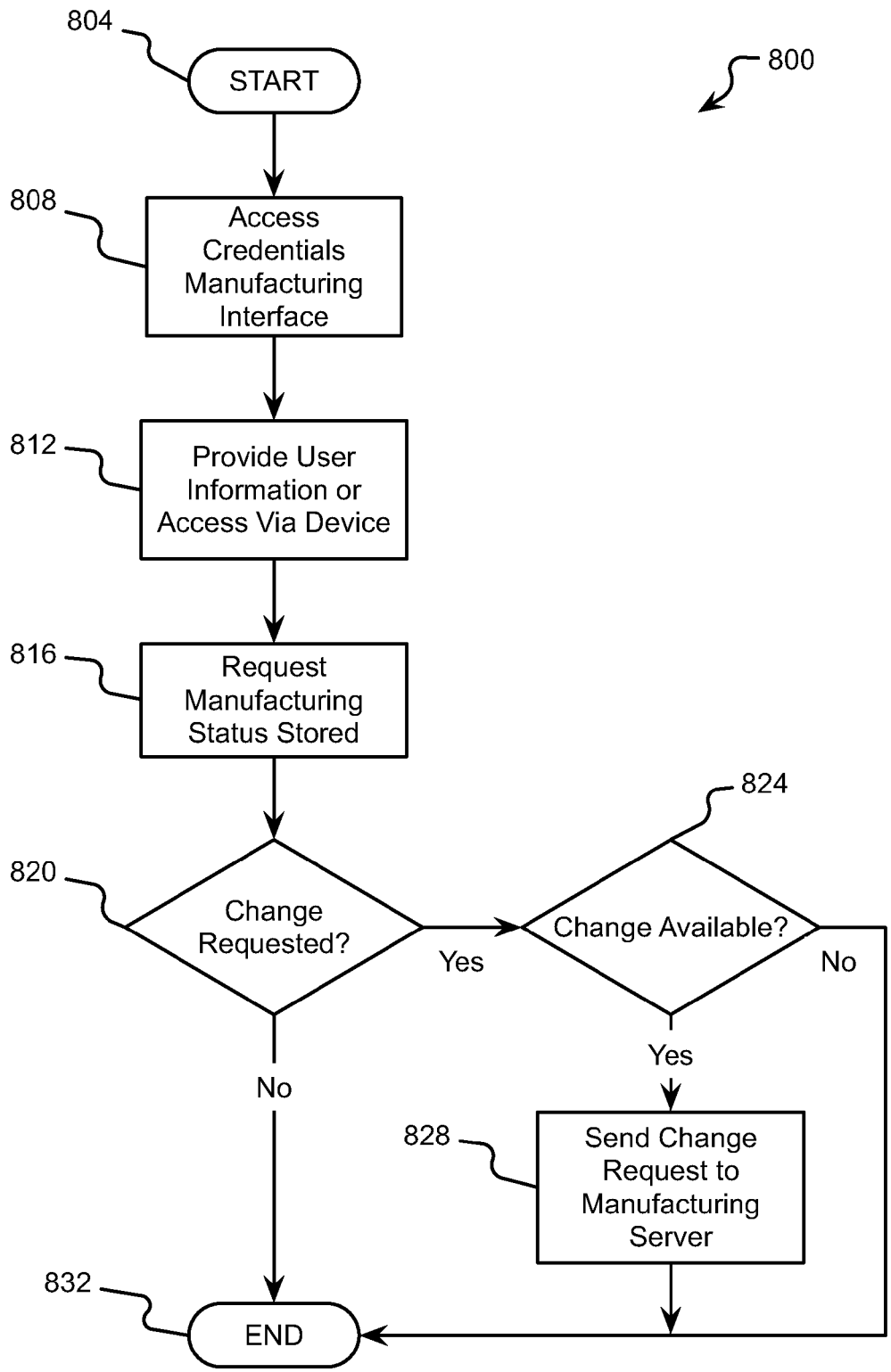
FIG. 8. is a flow diagram depicting a second access credentials application method operated via a mobile device in accordance with embodiments of the present disclosure.

FIG. 8. is a flow diagram depicting a second access credentials application 304 method 800 operated via a mobile device 108 in accordance with embodiments of the present disclosure. Although described in operation with a mobile device 108, it should be appreciated that the method 800 may be operated via any communication device with access to a credentials manufacturing interface. The method 800 begins at step 804 and proceeds when a user 128 accesses a credentials manufacturing interface. In some embodiments, the credentials manufacturing interface may be located on the mobile device 108 in communication with one or more server 112, 120. Additionally or alternatively, the credentials manufacturing interface may be located on some server that is configured to communicate with one or more credentials manufacturing server 112, 120. For example, the credentials manufacturing interface may be an application running via a website that may be accessed via a web browser. In one embodiment, the credentials manufacturing interface may be located on the credentials creation system server 112 or the credentials manufacturing server 120.

In some embodiments, the access credentials manufacturing interface may be configured to allow a user 128 to enter identifying information to access and even modify manufacturing information associated with an order (step 812). This identifying information may be entered manually or automatically. For instance, a user 128 may be automatically provided access to a manufacturing interface if the user 128 navigates to the interface via the mobile device 108. In this example, the manufacturing interface may be configured to recognize the mobile device 108 associated with the user 128. Recognition may be accomplished via the device 108 information disclosed herein (e.g., MAC address, hardware information, software information, etc.). In the event that a user 128 attempts to access the manufacturing interface via a web browser on another device, the user 128 may be prompted to manually enter identification information for proper authorization.

Upon gaining access to the credentials manufacturing interface a user 128 may request a manufacturing status associated with a manufacturing step of the access credentials (step 816). As can be appreciated, a user 128 may request a manufacturing status at any point during the manufacturing process. In some embodiments, the manufacturing status may present one or more user actions for input by a user 128. Among other things, the one or more user actions may be configured to allow a user to view, cancel, and/or modify a manufacturing order. As can be appreciated, the user actions may change depending on the stage of manufacturing. For instance, there may be a time during manufacturing when an order can be changed and a time when an order cannot be changed. Accordingly, some embodiments of the present disclosure anticipate providing a user 128 with various combinations of user action based on the stage of manufacturing.

The method 800 continues by determining whether a user 128 requests a change to the manufacturing order (step 820). If no change is requested, the user 128 may view the status of an order and then the method 800 may end at step 832. In the event that a user 128 requests a change to the order, the method 800 may proceed by determining whether a change is available (step 824). In some instances, an ability to change an order (e.g., canceling, modifying, and/or altering information associated with the order, etc.) may be presented as a user action via the manufacturing interface. If no change is available, a user action may not appear via the manufacturing interface. Additionally or alternatively, the user action may be "greyed out" to prevent selection by a user 128. In such cases, the user 128 may be able to view the status but not make any changes. Accordingly, the method 800 may then end at step 832.

In one embodiment, at least one change to the order may be available. In this case, the user 128 may send a change request to the manufacturing server 120 (step 828). It is anticipated that a change request may be accepted or denied by the manufacturing server 120. In some embodiments, the change request may be sent by selecting a user action on via a manufacturing interface. Once the change request is sent, the method 800 may end at step 832.

The above-described methods have primarily focused on manufacturing credentials (e.g., badges) with the utilization of an application running on a mobile device 108. It should be appreciated, however, that the use of a dedicated application on the mobile device 108 is not required. With reference now to FIGS. 9-13, additional methods used with a thin-client implementation of a self-enrollment process will be described in accordance with embodiments of the present disclosure. The methods or steps thereof discussed in connection with FIGS. 9-13 can be used alone or in combination with any of the other methods or method steps already described herein.

Figure 9:
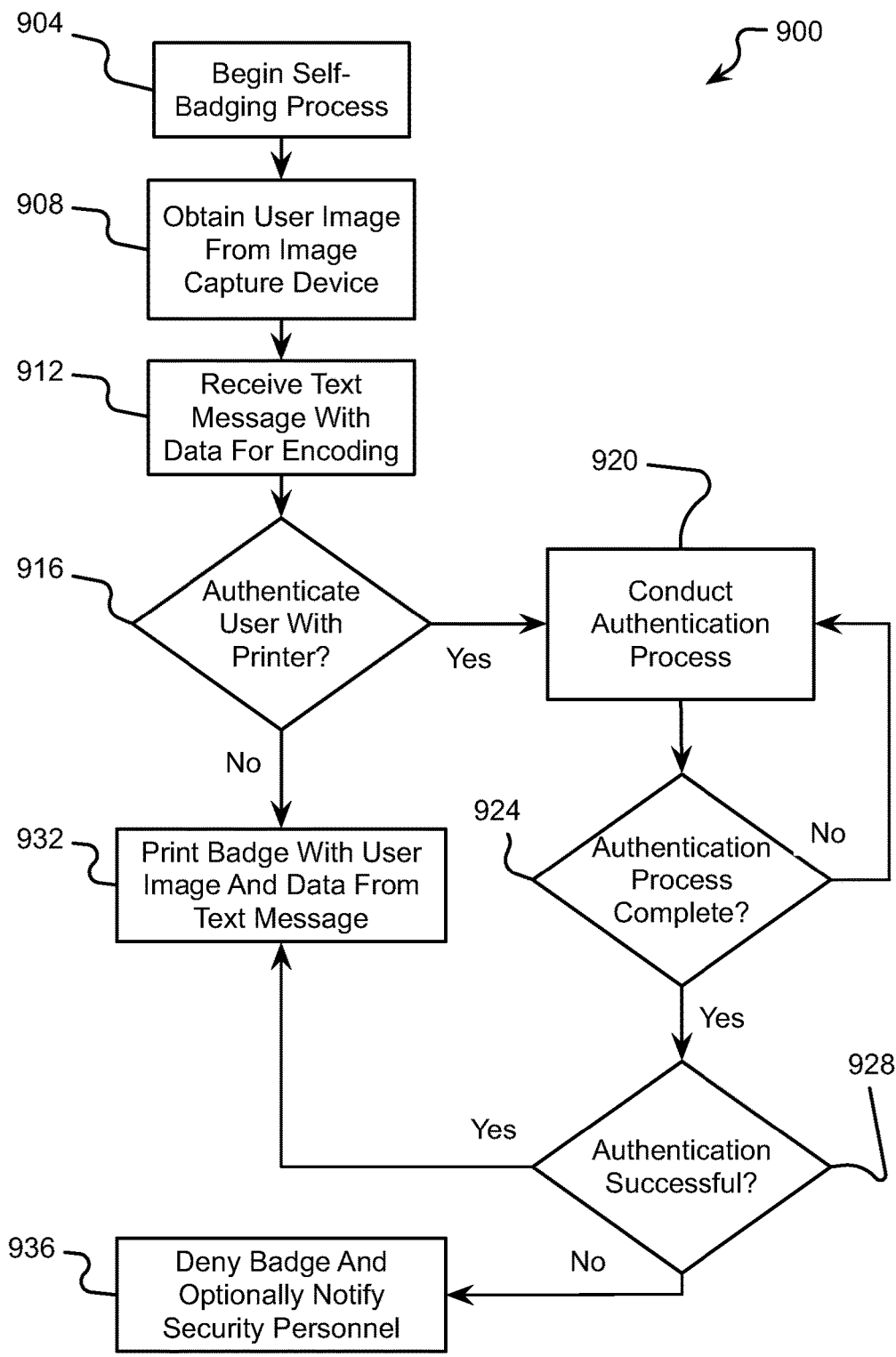
FIG. 9 is a flow diagram depicting yet another method of a self-badging process in accordance with embodiments of the present disclosure.

Referring now to FIG. 9, a self-enrollment process 900 will be described in accordance with embodiments of the present disclosure. The process 900 begins when a user initiates a self-badging or self-enrollment process (step 904). It should be appreciated that the terms "self-badging" and "self-enrollment" can be used interchangeably without departing from the scope of the present disclosure. In some embodiments, the process 900 may be initiated when a user opens a purpose-built application that is installed on mobile device 108. Alternatively or additionally, the self-enrollment process may begin when a user engages in a communication session, which may not necessarily require a purpose-built application to be installed on the mobile device 108. Examples of the types of communication session in which the user may engage to initiate the process 900 include, without limitation, a video call, a Voice over IP (VoIP) call, or any other real-time communication session.

The process 900 continues when a user image (e.g., a picture, video, or series of video frames of user 128) is captured via the mobile device 108 (step 908). As an example, the user 128 may press a button on their mobile device 108 that causes the mobile device 108 to capture an image of the user 128 via an image capture device (e.g., camera) of the mobile device 108. Alternatively or additionally, the user 128 may be engaged in a communication session with another person (e.g., a security administrator) and during the communication session either the user 128 or the other person involved in the communication session may store one or more images that are being communicated during the communication session (e.g., video frames transmitted from the user 128 to the other person). The storing of such images captured during the communication session may be initiated at the mobile device 108 by the user 128 or the other user may initiate storage of the captured images. Furthermore, the communication session between the user 128 and other user may be an authenticated or unauthenticated session. In the unauthenticated version, the image(s) of the user 128 may be stored and potentially used for generating a badge without requiring the user 128 to authenticate themselves in some other way. In the authenticated version, the capturing and/or storing of image(s) of the user 128 may be predicated and dependent upon the user 128 authenticating themselves either before or during the communication session.

After the one or more images have been captured, the process 900 continues with the user 128 providing additional data that will eventually be included in the printed badge (step 912). In some embodiments, this additional data (e.g., data in addition to the image of the user 128) may include one or more of the following types of data about the user 128: name, alias, identification number, hair color, eye color, height, weight, birthday, gender, age, employee number, office number, building location, phone number, email address, etc. This additional information may be captured from the user 128 via the mobile device 108 or some information may be automatically obtained during the communication session. For instance, it may be possible to obtain location information, phone number, gender, hair color, and the like during the communication session. In some embodiments, the additional data may be received via one or more textual messages. In some embodiments, the additional data may be automatically determined or identified by an intelligent system that is adapted to monitor the communication session and obtain such additional data. In some embodiments, the additional data may be obtained from one or more images of other identification documents carried by the user and the relevant information can be extracted from the image using OCR technologies, thereby minimizing the amount of manual user input required.

When manual user input is required, it may be desirable to utilize a standardized template for capturing and/or sending personal information. In particular, it may be desirable to send any data captured about the user in an encrypted format. Utilization of a standardized template may enable the application at the receiving end to easily recognize and process the information received at the printer or similar type of credentials manufacturing system 120. Also with respect to a template, it may be desirable to allow a user to define their own template of personal information. This template of additional information (and potentially images as well) may be provided from the mobile device 108 only in response to receiving a predetermined input from the user 128.

In some embodiments, both the image(s) of the user 128 and the additional data may be provided to a printer or similar type of credentials manufacturing system 120. Accordingly, it may be desirable or necessary to authenticate the user 128 to the printer prior to enabling the printer to print the requested badge (step 916). If authentication is not required, then the printer may automatically print a badge that includes one or more of the captured images of the user 128 as well as any other additional data (step 932). The additional data added to the badge may include some of the additional data obtained during step 912 and/or data entered by security personnel.

If, however, the printer requires some level of user authentication prior to issuing a badge, the printer may conduct a predetermined authentication process (step 920) whereby the printer analyzes information obtained from the mobile device 108 and/or the user 128 to ensure that the user 128 is acceptable to have a badge issued thereto. In some embodiments, the authentication process may involve the printer comparing the one or more captured images to other images captured at an earlier point in time (e.g., before the user initiated the self-enrollment process). Another authentication process may involve the mobile device 108 issuing a One-Time Password (OTP) along with either the captured image in step 908, the additional data transmitted in step 912, in response to the initiation of the communication session with the user 128, and/or in response to the termination of the communication session with the user 128 after the image of the user 128 was captured. The OTP may be transmitted from the mobile device 108 to the printer where it is compared, by a processor of the printer, with other OTPs (to make sure the mobile device 108 isn't re-transmitting an old password) or where the OTP is analyzed to ensure that it was generated in accordance with OTP-generating rules. Other authentication processes may involve the printer comparing the additional data received in step 912 with the image obtained in step 908 to ensure that there is at least a logical match between the two sets of data. For instance, the printer may compare the asserted gender, hair color, eye color, etc. received in the additional data with the image of the user 128.

At step 924, it is determined whether the authentication process has completed. If not, the process 900 returns back to step 920. If the authentication process is completed, then the process 900 continues by determining if the authentication was successful (step 928). If authentication was successful, the printer will continue by printing one or more badges for the user 128 (step 932). If the authentication was unsuccessful, then the printer will deny printing a badge for the user (step 936). In some embodiments, the printer may optionally notify security personnel that a self-enrollment process has been denied and the printer may further notify the security personnel for the reasons for such a denial of service (e.g., failed authentication, re-used password, etc.).

Figure 10:
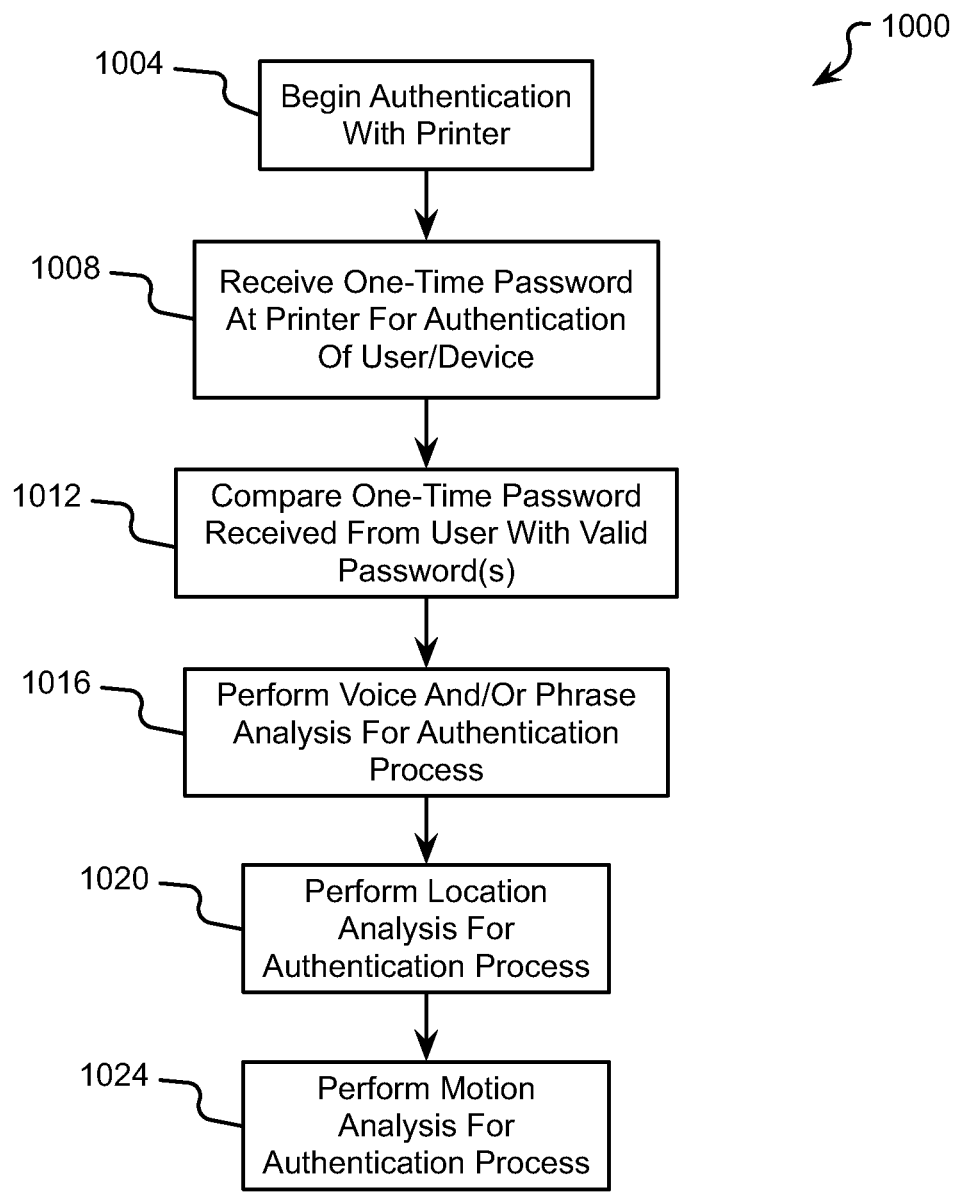
FIG. 10 is a flow diagram depicting a printer/user authentication process in accordance with embodiments of the present disclosure.

With reference now to FIG. 10, additional details of an authentication process 1000 performed at a printer will be described in accordance with embodiments of the present disclosure. The process 1000 begins when a printer or any other type of credentials manufacturing server 120 determines that a user is trying to self-enroll and that authentication of the user 128 and/or the user's mobile device 108 is required prior to completing the self-enrollment (step 1004). The process 1000 continues with the printer receiving a OTP password for authentication of the user 128 and/or the user's 128 mobile device 108 (step 1008). It should also be appreciated that the OTP can be tied to and used to authenticate the communication session that occurred when the user's 128 image was captured. For instance, the OTP may be linked to some aspect of the communication session by using a unique aspect of the communication session (e.g., a session identifier assigned to the communication session, a combination of the device identifiers involved in the communication session, a time at which the session began or ended, or combinations thereof) as a seed value for generating the OTP.

The printer may then perform an analysis of the OTP to determine if the OTP is valid and is not a replayed version of a previously-issued OTP (step 1012). In some embodiments, the printer may compare the currently-received OTP with previously-received OTPs to ensure that the currently-received OTP is not a replay. In some embodiments, the OTP may correspond to a code among a plurality of codes in a set of rolling codes and the printer may compare the received OTP with an expected OTP from the set of rolling codes. In some embodiments, the printer may analyze the OTP to ensure that the OTP is in an expected format (e.g., has the appropriate number and/or type of characters/numbers, has expected characters or numbers at expected locations, etc.) or has been generated using appropriate OTP-generating rules.

The printer may also perform a voice and/or phrase analysis in connection with the authentication process (step 1016). In particular, the printer may require the user 128 to speak a predetermined phrase as part of the authentication process. Alternatively or additionally, the printer may analyze characteristics of the user's 128 voice during a communication session and compare those characteristics to expected characteristics of pre-authorized users that are allowed to engage in self-enrollment. This analysis of voice characteristics and/or phrases by the printer may be performed during the communication session itself (e.g., as the user 128 and the security administrator are engaging in the communication session) or after the communication session has ended.

The process 1000 may also include a step where the printer or a network device attached thereto analyzes a current location of the mobile device 108 for authentication purposes (step 1020). In this particular authentication step, the location information of the mobile device 108 during the communication session and/or when the image of the user 128 was captured may be used to determine whether the user 128 is in an approved area for self-enrollment or, conversely, whether the user 128 is in a restricted area for self-enrollment. For instance, the user 128 may be restricted from performing self-enrollment for a corporation when they are located at home. The location information analyzed by the printer may correspond to GPS information obtained by the mobile device 108, cellular triangulation information obtained for the mobile device 108, location information determined based on which network the mobile device 108 is connected to and what type of access point is being used, location information obtained at the mobile device 108 from low power beacons and then forwarded to the printer (e.g., indoor location information) or combinations thereof.

Still another authentication step that may be performed in process 1000 is a motion analysis (step 1024). Specifically, motion information obtained from an accelerometer of the mobile device 108 may be used to ensure that a user 128 is holding the mobile device 108, thereby preventing an automated system from self-enrolling. Specifically, during the self-enrollment process, the user 128 may be provided with a random instruction to move the mobile device 108 in a particular pattern, direction, etc. and unless such a pattern or direction of motion is detected, the printer may determine that the user 128 is not actually holding the mobile device 108.

It should be appreciated that one, some, or all of the above-mentioned authentication processes can be performed and the authentication processes may or may not need to be performed in a particular order. In other words, certain types of self-enrollment processes in which a higher level of security is desired may require multiple authentication steps whereas lower levels of security may offer fewer or no authentication steps.

Figure 11:
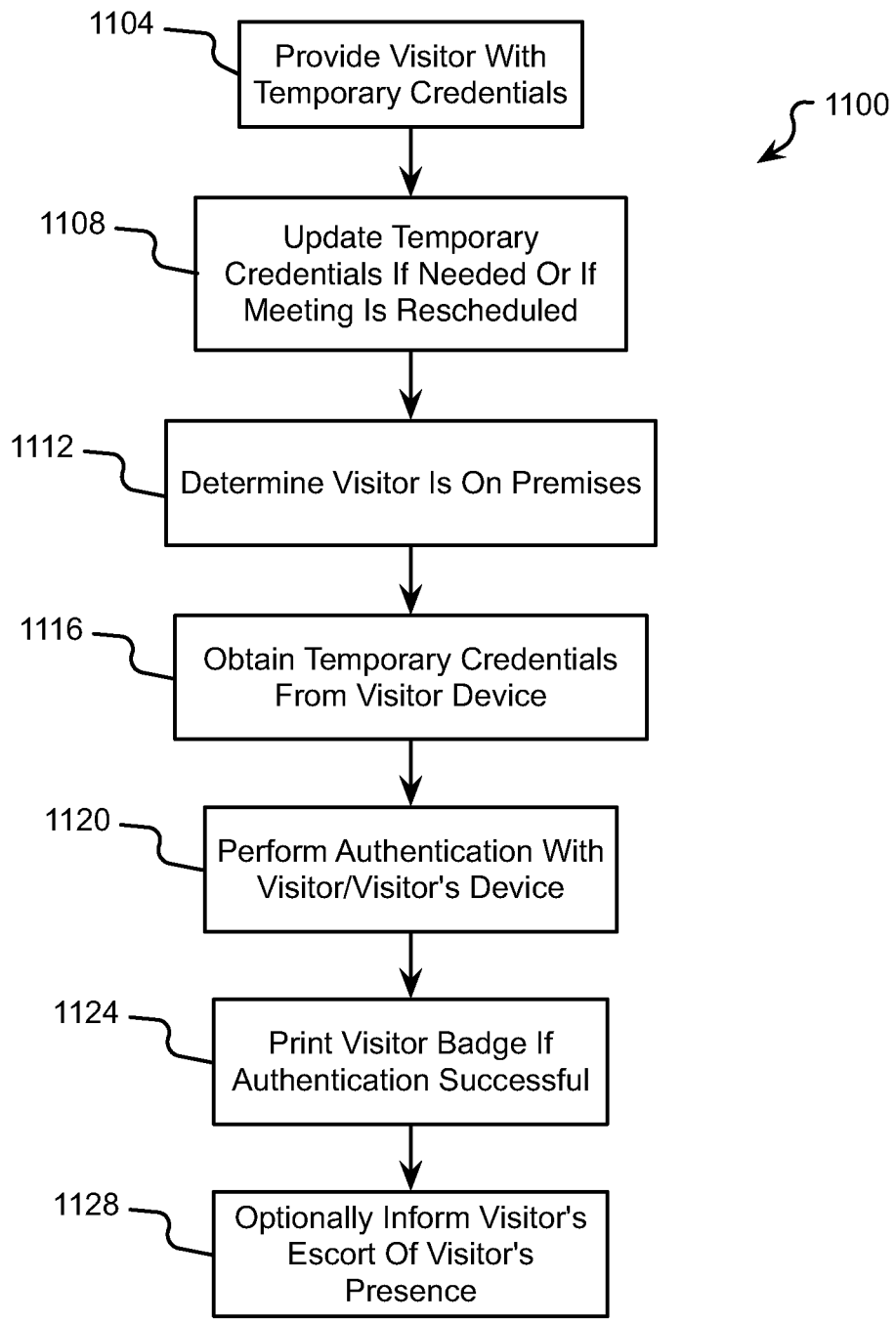
FIG. 11 is a flow diagram depicting a method of creating a visitor badge in accordance with embodiments of the present disclosure.

With reference now to FIG. 11, a process 1100 of creating a visitor badge using a self-enrollment process will be described in accordance with embodiments of the present disclosure. The process 1100 begins by determining that a visitor is to be provided with temporary credentials (step 1104). The temporary credentials may be provided in the form of a visitor badge (e.g., a printed badge) or as temporary virtual credentials that are transmitted to the visitor's mobile device 108 and stored in a secure element of the mobile device 108. The mobile device 108 may then be presented to a reader and the virtual credentials may be read from the secure element of the mobile device 108. The visitor credentials may be generated in advance of the user 128 visiting a site (e.g., in anticipation of the user 128 coming to the site). In some embodiments, the visitor credentials may be initially created with the permission of a security administrator and/or a sponsor employee that already has valid credentials.

The process 1100 may continue with an intelligent system determining if the visitor credentials need to be created (if they were not created a priori) or, if a change to the visitor's schedule has been detected, whether the pre-generated credentials need to be changed (step 1108). If such an update is necessary, then the visitor credentials can be updated automatically. The intelligent system may automatically or with the direction of a human security administrator, update the visitor credentials to align with the reschedule meeting. For instance, if the visitor's meeting has been moved from Tuesday to Wednesday, then the visitor's credentials may also be updated to only be issued for Wednesday and not Tuesday. Similarly, if the visitor's meeting is delayed by two hours, then the visitor's credentials may be adjusted to only be valid for the new meeting time (e.g., two hours later than the originally-prepared credentials).

Thereafter, the process 1100 may continue with the printer or the credentials creation system server 112 monitoring for a presence of the visitor on the premises (step 1112). This may be done by monitoring or searching for the visitor's mobile device 108 or by waiting until the visitor calls a predetermined number signifying that they have arrived at the premises. Alternatively or additionally, the visitor may have pre-elected to share their mobile device's 108 location information with the credentials creation system server 112 and when the visitor's mobile device 108 is determined to be on the premises or within a predetermined distance of the premises (e.g., in a parking lot of the premises), then the visitor may be determined to be on the premises.

Following step 1112, or if the continuation of the self-enrollment process was not dependent upon the visitor's presence on the premises, the process 1100 continues with the visitor's mobile device 108 providing some amount of authentication information as discussed in connection with process 1000 (step 1116). The process 1100 continues with the visitor's mobile device 108 authenticating with the printer and possibly vice versa, based on an exchange of information between the devices (step 1120). If the authentication is successful, then the printer will continue by printing the visitor badge for the visitor (step 1124). Alternatively or additionally, the visitor may be provided with a virtual credential and the virtual credential may be delivered to the mobile device 108 thereby enabling the mobile device 108 to use the credentials within the premises (e.g., to access one or more physical and/or logical assets on the premises). The access permissions of the visitor may also be controlled such that the visitor is required to also have an escort to obtain access to an asset within the premises. In other words, the visitor and the visitor's escort may both be required to present a valid credential to a reader before the reader allows access to an asset protected thereby.

The process 1100 may also have an optional step whereby the visitor's escort is notified of the visitor's presence (step 1128). In some embodiments, the visitor's escort may be notified of the visitor's presence when the visitor's presence is detected on premises at step 1112. Alternatively, the visitor's escort may not be notified until the visitor's credentials are printed and/or delivered to the visitor. Notification may occur by any type of communication such as a phone call, email, SMS message, MMS message, announcement, etc.

Figure 12:
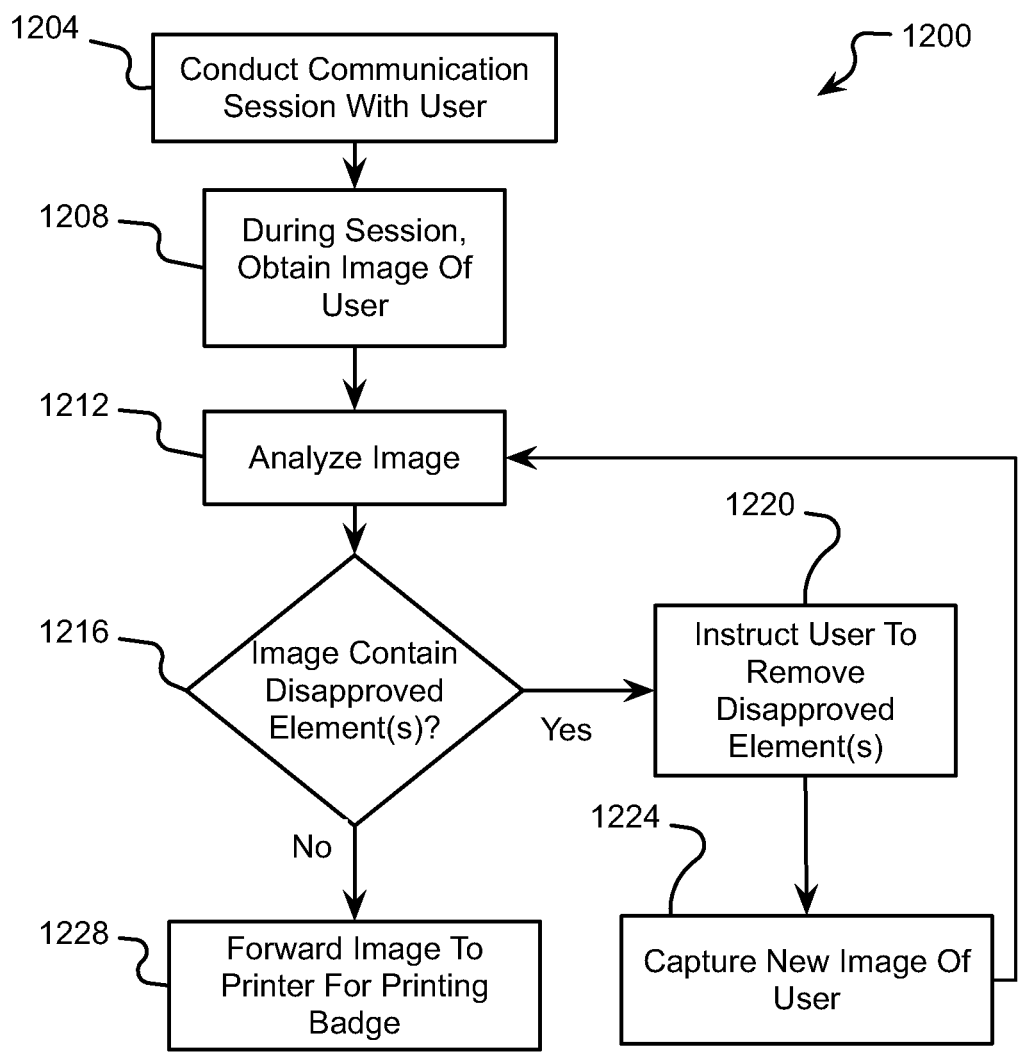
FIG. 12 is a flow diagram depicting a method of image capture and analysis used in connection with a self-enrollment process in accordance with embodiments of the present disclosure.

With reference now to FIG. 12, a process 1200 used during image capture for a self-enrollment process will be described in accordance with embodiments of the present disclosure. The process 1200 begins when a user 128 is conducting a communication session with another user, such as a security administrator or an escort for a visitor (step 1204). During the session, one or more images of the user 128 may be captured (step 1208). The images may be captured as the user 128 conducts a video communication session. Alternatively, if an audio-only session is being used, the user 128 may be instructed to capture a single image using a dedicated image-capture application on the mobile device 108.

The process 1200 continues by analyzing the one or more images that have been captured of the user 128 (step 1212). The analyzing entity (e.g., printer, credentials manufacturing server 120, credentials creations system server 112, or combinations thereof) may analyze the image(s) to determine if the image(s) contain one or more disapproved elements (step 1216). Non-limiting examples of disapproved elements may include hats, glasses, hoods, coats, scarfs, masks, objectionable background objects, images of other individuals, etc. Disapproved elements may also include blurry images or other defects in an image that, otherwise, does not have an objectionable object.

If the image is determined to include one or more disapproved elements, then the user 128 may be instructed to remove the disapproved elements (step 1220) and a new image of the user 128 may be captured (step 1224). The process 1200 will then return back to step 1212 where the image(s) are re-analyzed by the analyzing entity.

Once the image of the user 128 is determined to not have any disapproved elements, the process 1200 will continue with the image being forwarded to the printer for printing the badge or, alternatively, the printer may already have the image and release the image to a final printing process (step 1228). Utilizing this intelligent image analysis process 1200 enables a certain amount of automated control over the self-enrollment process and helps to ensure that quality and appropriate images are printed to the user's 128 credential.

Figure 13:
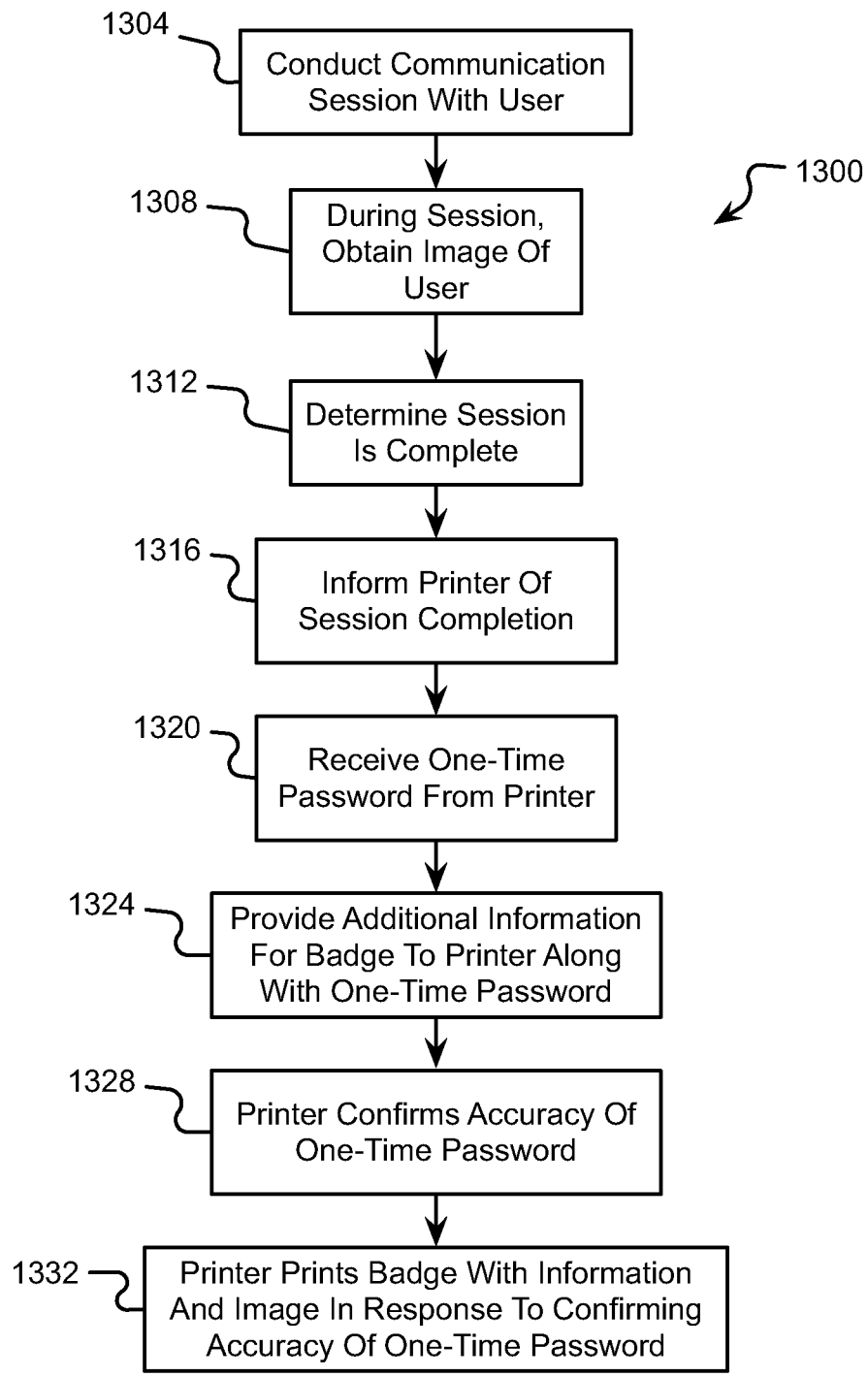
FIG. 13 is a flow diagram depicting a method of using a one-time password in connection with a credential manufacturing process in accordance with embodiments of the present disclosure.

With reference now to FIG. 13, a particular process 1300 of enabling user self-enrollment with a thin-client (e.g., without requiring a dedicated application on the mobile device 108 for self-enrollment) will be described in accordance with embodiments of the present disclosure. The process 1300 begins when a user 128 seeking self-enrollment is engaged in a communication session with another user, such as a security administrator or other approved person (step 1304). The communication session, in some embodiments, may correspond to a video session in which one or more video images of the user 128 are captured and delivered to the other user and displayed on the other user's communication device. As the images are being captured, the security administrator or the user 128 may be provided with a prompt showing an image of the user 128 that was automatically captured during the communication session (step 1308). The prompt may also ask the security administrator or the user 128 whether the automatically-captured image is acceptable for use in the user's 128 credential. If the user 128, the other user (e.g., security administrator), or both users confirm that the image is acceptable, then the users may be allowed to discontinue their communication session (step 1312).

Once the communication session is completed, the printer that will eventually print the user's 128 credential is informed of the session completion (step 1316). During this notification, the printer may generate and transmit a OTP to the user's mobile device 108 (step 1320). Upon receiving the OTP, the mobile device 108 may generate additional information that will be printed to the user's 128 credential (step 1324). In particular, the user 128 may be prompted to provide their name, address, gender, hair color, eye color, date of birth, combinations thereof, or any other information that is considered a requirement for printing a credential for the user 128. The mobile device 108 may send the additional information to the printer along with the OTP that was previously received from the printer.

When the printer receives the additional information and the OTP from the mobile device 108, the printer may analyze the OTP to confirm the accuracy thereof (step 1328). As an example, the printer may compare the OTP received from the mobile device 108 to the OTP that was sent in response to detecting the completion of the communication session. If the OTPs match, then the printer will print the badge with the information about the user 128 and the image of the user 128 (step 1332). As can be appreciated, a badge may correspond to a physical badge (e.g., paper or plastic) that carries the image and additional information. Alternatively or additionally, the badge may correspond to a virtual credential that is packaged and delivered back to the mobile device 108 in one or more messages or appropriate delivery mechanisms.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method of manufacturing an access credential for a user, comprising:
   collecting identification information of a user via a mobile device carried by the user;
   capturing at least one image of the user, wherein the at least one image is captured during a video communication session, and wherein the at least one image of the user is automatically obtained from a video stream carrying images of the user during the video communication session;
   authenticating at least one of the identification information of the user, the at least one image of the user, and the mobile device carried by the user;
   prompting at least one of the user and a security administrator to confirm that the at least one image of the user is suitable for printing on the at least one access credential for the user; and
   in response to the authenticating step and only in response to receiving an affirmative response to the prompt, preparing at least one access credential for the user, wherein preparing the at least one access credential for the user comprises at least one of manufacturing a physical component of the at least one access credential and manufacturing a logical component of the at least one access credential, wherein the at least one image of the user is used for the at least one access credential.

2. The method of claim 1, further comprising:
initiating an access credentials application on a mobile device, wherein initiating the access credentials application further comprises:
presenting the mobile device to a near field communication ("NFC") tag, wherein the mobile device includes an NFC module and NFC antenna;
reading, via the mobile device, the NFC tag, wherein the NFC tag includes instructions to initiate an access credentials application on the mobile device; and
opening the access credentials application in response to reading the NFC tag.

3. The method of claim 1, wherein the video communication session is between the user and a security administrator.

4. The method of claim 1, wherein the authenticating further comprises:
retrieving, from a memory, stored identification information of the user;
comparing the identification information of the user with the retrieved stored identification information of the user; and
determining, via the mobile device, that the compared identification information matches verification criteria within a predetermined threshold.

5. The method of claim 4, wherein the memory maintains stored identification information of a user on the mobile device.

6. The method of claim 4, wherein the memory maintains stored identification information of a user on a remote server, and wherein the remote server is located apart from the mobile device.

7. The method of claim 6, wherein retrieving the stored identification information further comprises communicating with the remote server across a network via a communication module associated with the mobile device.

8. The method of claim 1, wherein the mobile device carried by the user also provides device information for authentication, wherein the device information includes at least one of a media access control ("MAC") address, Internet Protocol (IP) address, installed hardware information, installed software information, installed firmware information, and subscriber identity module ("SIM") card information.

9. The method of claim 1, wherein the at least one access credential comprises a physical credential printed on at least one of paper and plastic.

10. The method of claim 1, wherein the at least one access credential comprises a virtual credential that is transmitted to the mobile device carried by the user.

11. A non-transitory computer readable medium with instructions stored thereon that when executed by a processor performs the method of claim 1.

12. An access credentials manufacturing system, comprising:
a mobile device comprising an image capture device configured to capture one or more images of a user of the mobile device during a video communication session;
at least one access credentials manufacturing device; and
a server, wherein the server is configured to communicate with the at least one access credentials manufacturing device, and wherein the server is further configured to prompt the user of the mobile device to capture the one or more images with the image capture device, automatically obtain the one or more images of the user of the mobile device from a video stream carrying images of the user of the mobile device during the video communication session, collect additional identification information about the user of the mobile device, and cause the at least one access credentials manufacturing device to manufacture an access credential for the user only in response to: (i) authenticating at least one of the mobile device and the user of the mobile device and (ii) determining that the one or more images are suitable for inclusion with the access credential.

13. The system of claim 12, wherein the one or more images of the user compared to one or more previously captured images of a user authorized to perform self-enrollment.

14. The system of claim 12, wherein the one or more images of the user are analyzed for disapproved elements prior to causing the at least one access credentials manufacturing device to manufacture the access credential for the user.

15. The system of claim 12, wherein the access credential for the user comprises at least one of a virtual credential stored in computer-readable memory and a physical credential printed on at least one of paper and plastic.

16. The system of claim 12, wherein additional personal information about the user of the mobile device is also obtained via the image capture device by capturing an image of an already-issued identification document for the user and then extracting the additional personal information about the user from the image of the already-issued identification document.

17. A method of manufacturing an access credential for a user, comprising:
prompting a user of a mobile device to capture an image of the user with the mobile device during a video communication session;
prompting the user of the mobile device for identification information;
automatically capturing the image of the user from a video stream carrying images of the user during the video communication session;
collecting the identification information via the mobile device;
authenticating at least one of the identification information of the user, the captured image of the user, and the mobile device carried by the user;
confirming that the captured image of the user is suitable for printing on an access credential for the user;
in response to both the authentication step and the confirming step, preparing the access credential for the user by manufacturing a physical component of the access credential, wherein the access credential includes the captured image of the user; and
delivering the physical component of the access credential to the user.

18. A method of manufacturing an access credential for a user, comprising:
prompting a user of a mobile device to capture an image of the user with the mobile device during a video communication session;

prompting the user of the mobile device for identification information;

collecting the identification information via the mobile device;

authenticating at least one of the identification information of the user, the captured image of the user, and the mobile device carried by the user;

confirming that the captured image of the user is suitable for printing on an access credential for the user;

in response to both the authentication step and the confirming step, preparing the access credential for the user by manufacturing a logical component of the access credential, wherein the access credential includes the captured image of the user; and transmitting, via a communication network, the logical component of the access credential to the mobile device of the user.

19. The method of claim 18, wherein transmitting comprises encrypting the access credential and the captured image of the user prior to transmission via the communication network.

20. The method of claim 18, wherein the prompt is provided during the video communication session.

21. The method of claim 18, wherein the video communication session is between the user and a security administrator.

22. The method of claim 18, wherein the authenticating further comprises:

retrieving, from a memory, stored identification information of the user;

comparing the collected identification information of the user with the retrieved stored identification information of the user; and determining, via the mobile device, that the compared identification information matches verification criteria within a predetermined threshold.

23. The method of claim 18, wherein the mobile device also provides device information for authentication, wherein the device information includes at least one of a media access control ("MAC") address, Internet Protocol (IP) address, installed hardware information, installed software information, installed firmware information, and subscriber identity module ("SIM") card information.

24. The method of claim 17, wherein the mobile device also provides device information for authentication, wherein the device information includes at least one of a media access control ("MAC") address, Internet Protocol (IP) address, installed hardware information, installed software information, installed firmware information, and subscriber identity module ("SIM") card information.

25. The method of claim 17, wherein the authenticating further comprises:

retrieving, from a memory, stored identification information of the user;

comparing the collected identification information of the user with the retrieved stored identification information of the user; and determining, via the mobile device, that the compared identification information matches verification criteria within a predetermined threshold.

26. The method of claim 17, wherein the video communication session is between the user and a security administrator.

27. The method of claim 17, wherein the prompt is provided during the video communication session.

* * * * *